(12) United States Patent
Appelman et al.

(10) Patent No.: US 9,571,439 B2
(45) Date of Patent: *Feb. 14, 2017

(54) SYSTEMS AND METHODS FOR NOTIFICATION DELIVERY

(71) Applicant: Facebook, Inc., Menlo Park, CA (US)

(72) Inventors: Barry Appelman, McLean, VA (US);
Muhammad Mohsin Hussain,
Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,775

(22) Filed: Feb. 14, 2013

(65) Prior Publication Data

US 2013/0159439 A1 Jun. 20, 2013

Related U.S. Application Data

(63) Continuation of application No. 13/729,318, filed on Dec. 28, 2012, now abandoned, which is a
(Continued)

(51) Int. Cl.
*G06F 15/16* (2006.01)
*H04L 12/58* (2006.01)
(Continued)

(52) U.S. Cl.
CPC ............... *H04L 51/24* (2013.01); *G06F 9/54* (2013.01); *G06F 9/542* (2013.01); *G06Q 10/10* (2013.01);
(Continued)

(58) Field of Classification Search
None
See application file for complete search history.

(56) References Cited

U.S. PATENT DOCUMENTS 4,028,496 A 6/1977 LaMarche et al.
4,650,927 A 3/1987 James
(Continued)

FOREIGN PATENT DOCUMENTS

CA 2547240 12/2009
CA 2506417 6/2011
(Continued)

OTHER PUBLICATIONS

U.S. Appl. No. 10/715,213, filed Nov. 18, 2003, Schlegel.
(Continued)

*Primary Examiner* — John B Walsh
(74) *Attorney, Agent, or Firm* — Keller Jolley Preece

(57) ABSTRACT

An electronic message may be reconfigured to effect an enhanced notification using an input interface to receive at least one electronic message created by or on behalf of a message source for delivery to an intended recipient. A matching engine determines whether the electronic message corresponds to a predetermined definition of an enhanced notification. An enhancement engine reconfigures the electronic message to the enhanced notification if stored information related to the intended recipient indicates that the intended recipient is subscribed to receive the enhanced notification. Reconfiguring the electronic message may include reconfiguring the message to provide special handling, routing or presentation.

50 Claims, 10 Drawing Sheets

Related U.S. Application Data continuation of application No. 13/189,972, filed on Jul. 25, 2011, which is a continuation of application No. 12/626,099, filed on Nov. 25, 2009, now Pat. No. 8,001,199, which is a continuation of application No. 10/715,206, filed on Nov. 18, 2003, now Pat. No. 7,640,306.

(60) Provisional application No. 60/426,806, filed on Nov. 18, 2002, provisional application No. 60/428,234, filed on Nov. 22, 2002.

(51) Int. Cl.
  G06F 9/54 (2006.01)
  G06Q 10/10 (2012.01)
  G06Q 30/02 (2012.01)
  G06Q 30/08 (2012.01)

(52) U.S. Cl.
  CPC .............. *G06Q 30/02* (2013.01); *G06Q 30/08* (2013.01); *H04L 51/04* (2013.01); *H04L 51/043* (2013.01); *H04L 51/06* (2013.01)

(56) References Cited

U.S. PATENT DOCUMENTS

| | | |
|---|---|---|
| 4,700,392 A | 10/1987 | Kato et al. |
| 4,817,129 A | 3/1989 | Riskin |
| 4,837,798 A | 6/1989 | Cohen et al. |
| 4,975,657 A | 12/1990 | Eastmond |
| 5,008,853 A | 4/1991 | Bly et al. |
| 5,021,949 A | 6/1991 | Morten et al. |
| 5,025,252 A | 6/1991 | DeLuca et al. |
| 5,086,394 A | 2/1992 | Shapira |
| 5,101,424 A | 3/1992 | Clayto et al. |
| 5,276,905 A | 1/1994 | Hurst et al. |
| 5,315,636 A | 5/1994 | Patel |
| 5,329,619 A | 7/1994 | Page et al. |
| 5,351,235 A | 9/1994 | Lahtinen |
| 5,425,028 A | 6/1995 | Bitton et al. |
| 5,428,778 A | 6/1995 | Brookes |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,557,320 A | 9/1996 | Krebs |
| 5,557,659 A | 9/1996 | Hyde-Thompson |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,574,824 A | 11/1996 | Slyh et al. |
| 5,579,472 A | 11/1996 | Keyworth, II et al. |
| 5,590,133 A | 12/1996 | Bilstrom et al. |
| 5,592,538 A | 1/1997 | Kosowsky et al. |
| 5,604,788 A | 2/1997 | Tett |
| 5,608,786 A | 3/1997 | Gordon |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,705,995 A | 1/1998 | Laflin et al. |
| 5,706,211 A | 1/1998 | Beletic et al. |
| 5,706,501 A | 1/1998 | Horikiri |
| 5,710,884 A | 1/1998 | Dedrick |
| 5,717,656 A | 2/1998 | Dourbal |
| 5,721,906 A | 2/1998 | Siefert |
| 5,724,567 A | 3/1998 | Rose et al. |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis et al. |
| 5,760,771 A | 6/1998 | Blonder et al. |
| 5,761,196 A | 6/1998 | Ayerst et al. |
| 5,764,916 A | 6/1998 | Busey et al. |
| 5,771,280 A | 6/1998 | Johnson et al. |
| 5,774,670 A | 6/1998 | Montulli |
| 5,774,673 A | 6/1998 | Beuk |
| 5,790,974 A | 8/1998 | Tognazzini |
| 5,793,365 A | 8/1998 | Tang et al. |
| 5,793,762 A | 8/1998 | Penners et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,812,865 A | 9/1998 | Theimer et al. |
| 5,819,084 A | 10/1998 | Shapiro et al. |
| 5,825,771 A | 10/1998 | Cohen et al. |
| 5,826,025 A | 10/1998 | Gramlich |
| 5,835,089 A | 11/1998 | Skarbo et al. |
| 5,835,722 A | 11/1998 | Bradshaw et al. |
| 5,835,905 A | 11/1998 | Pirolli et al. |
| 5,845,073 A | 12/1998 | Carlin et al. |
| 5,845,300 A | 12/1998 | Comer et al. |
| 5,848,134 A | 12/1998 | Sekiguchi et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,878,233 A | 3/1999 | Schloss |
| 5,878,397 A | 3/1999 | Stille et al. |
| 5,893,091 A | 4/1999 | Hunt et al. |
| 5,893,099 A | 4/1999 | Schreiber et al. |
| 5,895,454 A | 4/1999 | Harrington |
| 5,896,321 A | 4/1999 | Miller et al. |
| 5,897,635 A | 4/1999 | Torres et al. |
| 5,903,726 A | 5/1999 | Donovan et al. |
| 5,913,032 A | 6/1999 | Schwartz et al. |
| 5,920,692 A | 7/1999 | Nguyen et al. |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack |
| 5,946,617 A | 8/1999 | Portaro et al. |
| 5,946,629 A | 8/1999 | Sawyer et al. |
| 5,946,630 A | 8/1999 | Willars et al. |
| 5,950,193 A | 9/1999 | Kulkarni |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,074 A | 9/1999 | Clark |
| 5,960,173 A | 9/1999 | Tang et al. |
| 5,960,429 A | 9/1999 | Peercy et al. |
| 5,961,620 A | 10/1999 | Trent et al. |
| 5,966,663 A | 10/1999 | Gleason |
| 5,970,122 A | 10/1999 | LaPorta et al. |
| 5,974,446 A | 10/1999 | Sonnenreich et al. |
| 5,978,673 A | 11/1999 | Alperovich et al. |
| 5,978,842 A | 11/1999 | Noble et al. |
| 5,987,113 A | 11/1999 | James |
| 5,987,376 A | 11/1999 | Olson et al. |

(56) References Cited

U.S. PATENT DOCUMENTS

| | | |
|---|---|---|
| 5,991,791 A | 11/1999 | Siefert |
| 5,999,932 A | 12/1999 | Paul |
| 6,006,331 A | 12/1999 | Chu et al. |
| 6,009,413 A | 12/1999 | Webber et al. |
| 6,012,051 A | 1/2000 | Sammon, Jr. et al. |
| 6,014,429 A | 1/2000 | LaPorta et al. |
| 6,014,638 A | 1/2000 | Burge et al. |
| 6,020,884 A | 2/2000 | MacNaughton et al. |
| 6,021,433 A | 2/2000 | Payne et al. |
| 6,026,403 A | 2/2000 | Siefert |
| 6,026,429 A | 2/2000 | Jones et al. |
| 6,028,866 A | 2/2000 | Engel |
| 6,038,445 A | 3/2000 | Alperovich et al. |
| 6,038,451 A | 3/2000 | Syed et al. |
| 6,038,542 A | 3/2000 | Ruckdashel |
| 6,040,770 A | 3/2000 | Britton |
| 6,041,311 A | 3/2000 | Chislenko et al. |
| 6,049,533 A | 4/2000 | Norman et al. |
| 6,049,565 A | 4/2000 | Paradine et al. |
| 6,049,777 A | 4/2000 | Sheena et al. |
| 6,061,056 A | 5/2000 | Menard et al. |
| 6,064,723 A | 5/2000 | Cohen et al. |
| 6,064,976 A | 5/2000 | Tolopka |
| 6,065,047 A | 5/2000 | Carpenter et al. |
| 6,065,056 A | 5/2000 | Bradshaw et al. |
| 6,067,529 A | 5/2000 | Ray et al. |
| 6,067,561 A | 5/2000 | Dillon |
| 6,070,140 A | 5/2000 | Tran |
| 6,073,109 A | 6/2000 | Flores |
| 6,073,138 A | 6/2000 | de l'Etraz |
| 6,076,100 A | 6/2000 | Cottrille et al. |
| 6,078,740 A | 6/2000 | DeTreville et al. |
| 6,081,829 A | 6/2000 | Sidana |
| 6,081,830 A | 6/2000 | Schindler |
| 6,085,223 A | 7/2000 | Carino, Jr. et al. |
| 6,088,435 A | 7/2000 | Barber |
| 6,091,948 A | 7/2000 | Carr et al. |
| 6,091,958 A | 7/2000 | Bergkvist et al. |
| 6,092,049 A | 7/2000 | Chislenko et al. |
| 6,094,681 A | 7/2000 | Shaffer et al. |
| 6,112,078 A | 8/2000 | Sormunen et al. |
| 6,112,181 A | 8/2000 | Shear |
| 6,115,455 A | 9/2000 | Picard |
| 6,115,605 A | 9/2000 | Siccardo et al. |
| 6,119,014 A | 9/2000 | Alperovich et al. |
| 6,128,603 A | 10/2000 | Dent et al. |
| 6,128,624 A | 10/2000 | Papierniak et al. |
| 6,128,739 A | 10/2000 | Fleming, III |
| 6,134,432 A | 10/2000 | Holmes et al. |
| 6,134,446 A | 10/2000 | Sasuta et al. |
| 6,134,582 A | 10/2000 | Kennedy |
| 6,138,146 A | 10/2000 | Moon et al. |
| 6,138,158 A | 10/2000 | Boyle et al. |
| 6,141,545 A | 10/2000 | Begeja et al. |
| 6,144,959 A | 11/2000 | Anderson |
| 6,148,197 A | 11/2000 | Bridges et al. |
| 6,148,328 A | 11/2000 | Cuomo et al. |
| 6,148,377 A | 11/2000 | Carter |
| 6,151,584 A | 11/2000 | Papierniak et al. |
| 6,157,618 A | 12/2000 | Boss et al. |
| 6,161,129 A | 12/2000 | Rochkind |
| 6,161,130 A | 12/2000 | Horvitz et al. |
| 6,166,730 A | 12/2000 | Goode et al. |
| 6,167,256 A | 12/2000 | Yla-Outinen |
| 6,169,911 B1 | 1/2001 | Wagner et al. |
| 6,175,831 B1 | 1/2001 | Weinreich et al. |
| 6,175,859 B1 | 1/2001 | Mohler |
| 6,178,331 B1 | 1/2001 | Holmes et al. |
| 6,185,603 B1 | 2/2001 | Henderson et al. |
| 6,189,026 B1 | 2/2001 | Birrell et al. |
| 6,192,396 B1 | 2/2001 | Kohler |
| 6,195,354 B1 | 2/2001 | Skalecki et al. |
| 6,195,651 B1 | 2/2001 | Handel et al. |
| 6,195,657 B1 | 2/2001 | Rucker et al. |
| 6,198,738 B1 | 3/2001 | Chang et al. |
| 6,199,099 B1 | 3/2001 | Gershman et al. |
| 6,199,103 B1 | 3/2001 | Sakaguchi et al. |
| 6,208,996 B1 * | 3/2001 | Ben-Shachar et al. |
| 6,212,175 B1 | 4/2001 | Harsch |
| 6,212,206 B1 | 4/2001 | Ketcham |
| 6,212,548 B1 | 4/2001 | DeSimone et al. |
| 6,212,550 B1 | 4/2001 | Segur |
| 6,219,413 B1 | 4/2001 | Burg |
| 6,223,177 B1 | 4/2001 | Tatham |
| 6,237,027 B1 | 5/2001 | Namekawa |
| 6,237,092 B1 | 5/2001 | Hayes, Jr. |
| 6,243,039 B1 | 6/2001 | Elliot |
| 6,243,714 B1 | 6/2001 | Shapiro et al. |
| 6,247,043 B1 | 6/2001 | Bates et al. |
| 6,252,952 B1 | 6/2001 | Kung et al. |
| 6,256,516 B1 | 7/2001 | Wagner et al. |
| 6,259,677 B1 | 7/2001 | Jain |
| 6,259,911 B1 | 7/2001 | Bims et al. |
| 6,260,148 B1 * | 7/2001 | Aggarwal et al. ............... 726/14 |
| 6,269,369 B1 | 7/2001 | Robertson |
| 6,282,435 B1 | 8/2001 | Wagner et al. |
| 6,292,743 B1 | 9/2001 | Pu et al. |
| 6,292,825 B1 | 9/2001 | Chang et al. |
| 6,301,609 B1 | 10/2001 | Aravamudan et al. |
| 6,304,864 B1 | 10/2001 | Liddy et al. |
| 6,311,211 B1 | 10/2001 | Shaw |
| 6,317,831 B1 | 11/2001 | King |
| 6,324,541 B1 | 11/2001 | de l'Etraz et al. |
| 6,327,590 B1 | 12/2001 | Chidlovski et al. |
| 6,330,590 B1 | 12/2001 | Cotten |
| 6,334,111 B1 | 12/2001 | Carrott |
| 6,337,712 B1 | 1/2002 | Shiota et al. |
| 6,343,317 B1 | 1/2002 | Glorikian |
| 6,347,332 B1 | 2/2002 | Malet |
| 6,349,299 B1 | 2/2002 | Spencer et al. |
| 6,351,761 B1 | 2/2002 | Cantone et al. |
| 6,351,777 B1 | 2/2002 | Simonoff |
| 6,360,251 B1 | 3/2002 | Fujita et al. |
| 6,360,252 B1 | 3/2002 | Rudy et al. |
| 6,363,248 B1 | 3/2002 | Silverman |
| 6,366,907 B1 | 4/2002 | Fanning |
| 6,374,246 B1 | 4/2002 | Matsuo |
| 6,374,260 B1 | 4/2002 | Hoffert et al. |
| 6,374,290 B1 | 4/2002 | Scharber |
| 6,377,931 B1 | 4/2002 | Shlomot |
| 6,381,594 B1 | 4/2002 | Eichstaedt et al. |
| 6,385,455 B1 | 5/2002 | St. Clair et al. |
| 6,385,619 B1 | 5/2002 | Eichstaedt et al. |
| 6,385,662 B1 | 5/2002 | Moon et al. |
| 6,389,032 B1 | 5/2002 | Cohen |
| 6,389,127 B1 | 5/2002 | Vardi et al. |
| 6,389,372 B1 | 5/2002 | Glance et al. |
| 6,392,669 B1 | 5/2002 | Matoba et al. |
| 6,393,464 B1 | 5/2002 | Dieterman |
| 6,393,465 B2 | 5/2002 | Leeds |
| 6,396,512 B1 | 5/2002 | Nickerson |
| 6,400,810 B1 | 6/2002 | Skladman et al. |
| 6,404,438 B1 | 6/2002 | Hatleid |
| 6,405,035 B1 | 6/2002 | Singh |
| 6,405,204 B1 | 6/2002 | Baker et al. |
| 6,408,282 B1 | 6/2002 | Buist |
| 6,415,318 B1 | 7/2002 | Aggarwal et al. |
| 6,418,203 B1 | 7/2002 | Marcie |
| 6,421,439 B1 | 7/2002 | Liffick |
| 6,421,675 B1 | 7/2002 | Ryan |
| 6,421,709 B1 | 7/2002 | McCormick et al. |
| 6,423,012 B1 | 7/2002 | Kato et al. |
| 6,424,996 B1 | 7/2002 | Killcommons et al. |
| 6,425,006 B1 | 7/2002 | Chari et al. |
| 6,425,012 B1 | 7/2002 | Trovato et al. |
| 6,430,602 B1 | 8/2002 | Kay et al. |
| 6,430,604 B1 | 8/2002 | Ogle et al. |
| 6,434,599 B1 | 8/2002 | Porter |
| 6,434,606 B1 | 8/2002 | Borella et al. |
| 6,442,589 B1 | 8/2002 | Takahashi et al. |
| 6,442,591 B1 | 8/2002 | Haynes et al. |
| 6,442,598 B1 | 8/2002 | Wright et al. |
| 6,446,112 B1 | 9/2002 | Bunney et al. |
| 6,446,118 B1 | 9/2002 | Gottlieb |

(56) References Cited

U.S. PATENT DOCUMENTS

| | | |
|---|---|---|
| 6,446,119 B1 | 9/2002 | Olah et al. |
| 6,449,344 B1 | 9/2002 | Goldfinger et al. |
| 6,449,365 B1 | 9/2002 | Hodges et al. |
| 6,449,479 B1 | 9/2002 | Sanchez |
| 6,449,634 B1 | 9/2002 | Capiel |
| 6,452,950 B1 | 9/2002 | Ohisson et al. |
| 6,457,044 B1 | 9/2002 | Iwazaki |
| 6,457,062 B1 | 9/2002 | Pivowar |
| 6,460,073 B1 | 10/2002 | Asakura |
| 6,463,464 B1 | 10/2002 | Lazaridis et al. |
| 6,463,471 B1 | 10/2002 | Dreke et al. |
| 6,466,918 B1 | 10/2002 | Spiegel et al. |
| 6,466,969 B1 | 10/2002 | Bunney et al. |
| 6,473,629 B1 | 10/2002 | Chang et al. |
| 6,480,830 B1 | 11/2002 | Ford et al. |
| 6,480,885 B1 | 11/2002 | Olivier |
| 6,483,913 B1 | 11/2002 | Smith |
| 6,484,196 B1 | 11/2002 | Maurille |
| 6,487,583 B1 | 11/2002 | Harvey et al. |
| 6,487,584 B1 | 11/2002 | Bunney |
| 6,490,584 B2 | 12/2002 | Barrett et al. |
| 6,493,703 B1 | 12/2002 | Knight et al. |
| 6,499,053 B1 | 12/2002 | Marquette |
| 6,505,167 B1 | 1/2003 | Horvitz et al. |
| 6,507,866 B1 | 1/2003 | Barchi |
| 6,512,570 B2 | 1/2003 | Garfinkle et al. |
| 6,512,930 B2 | 1/2003 | Sandegren |
| 6,513,026 B1 | 1/2003 | Horvitz et al. |
| 6,515,681 B1 | 2/2003 | Knight |
| 6,519,629 B2 | 2/2003 | Harvey et al. |
| 6,519,639 B1 | 2/2003 | Glasser et al. |
| 6,519,648 B1 | 2/2003 | Eyal |
| 6,529,586 B1 | 3/2003 | Elvins et al. |
| 6,529,903 B2 | 3/2003 | Smith et al. |
| 6,535,228 B1 | 3/2003 | Bandaru et al. |
| 6,535,586 B1 | 3/2003 | Cloutier et al. |
| 6,539,375 B2 | 3/2003 | Kawasaki |
| 6,539,421 B1 | 3/2003 | Appelman et al. |
| 6,542,500 B1 | 4/2003 | Gerzberg et al. |
| 6,549,933 B1 | 4/2003 | Barrett et al. |
| 6,549,937 B1 | 4/2003 | Auerbach et al. |
| 6,553,416 B1 | 4/2003 | Chari et al. |
| 6,556,823 B2 | 4/2003 | Clapton et al. |
| 6,557,027 B1 | 4/2003 | Cragun |
| 6,564,213 B1 | 5/2003 | Ortega et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,567,807 B1 | 5/2003 | Robles |
| 6,567,854 B1 | 5/2003 | Olshansky et al. |
| 6,571,234 B1 | 5/2003 | Knight et al. |
| 6,578,025 B1 | 6/2003 | Pollack et al. |
| 6,583,799 B1 | 6/2003 | Manolis et al. |
| 6,584,494 B1 | 6/2003 | Manabe et al. |
| 6,587,127 B1 | 7/2003 | Leeke et al. |
| 6,594,363 B1 | 7/2003 | Kim |
| 6,594,673 B1 | 7/2003 | Smith et al. |
| 6,594,682 B2 | 7/2003 | Peterson et al. |
| 6,598,172 B1 | 7/2003 | VanDeusen et al. |
| 6,600,725 B1 | 7/2003 | Roy |
| 6,604,079 B1 | 8/2003 | Ruvolo et al. |
| 6,604,133 B2 | 8/2003 | Aggarwal et al. |
| 6,606,647 B2 | 8/2003 | Shah et al. |
| 6,606,657 B1 | 8/2003 | Zilberstein et al. |
| 6,607,136 B1 | 8/2003 | Atsmon et al. |
| 6,611,822 B1 | 8/2003 | Beams |
| 6,615,237 B1 | 9/2003 | Kyne et al. |
| 6,615,241 B1 | 9/2003 | Miller et al. |
| 6,618,747 B1 | 9/2003 | Flynn et al. |
| 6,625,423 B1 | 9/2003 | Wang |
| 6,628,194 B1 | 9/2003 | Hellebust et al. |
| 6,633,630 B1 | 10/2003 | Owens et al. |
| 6,636,733 B1 | 10/2003 | Helferich |
| 6,636,850 B2 | 10/2003 | Lepien |
| 6,636,888 B1 | 10/2003 | Bookspan et al. |
| 6,640,218 B1 | 10/2003 | Golding |
| 6,640,223 B1 | 10/2003 | Jones et al. |
| 6,643,641 B1 | 11/2003 | Snyder |
| 6,643,669 B1 | 11/2003 | Novak et al. |
| 6,647,259 B1 | 11/2003 | Boyle et al. |
| 6,647,383 B1 | 11/2003 | August et al. |
| 6,654,800 B1 | 11/2003 | Rieger, III |
| 6,658,095 B1 | 12/2003 | Yoakum et al. |
| 6,658,260 B2 | 12/2003 | Knotts |
| 6,661,793 B1 | 12/2003 | Pogrebinsky |
| 6,665,317 B1 | 12/2003 | Scott |
| 6,665,676 B2 | 12/2003 | Twig et al. |
| 6,665,715 B1 | 12/2003 | Houri |
| 6,665,728 B1 | 12/2003 | Graumann et al. |
| 6,671,508 B1 | 12/2003 | Sugano et al. |
| 6,677,968 B1 | 1/2004 | Appelman |
| 6,678,719 B1 | 1/2004 | Stimmel |
| 6,678,866 B1 | 1/2004 | Sugimoto et al. |
| 6,683,889 B1 | 1/2004 | Shaffer et al. |
| 6,684,240 B1 | 1/2004 | Goddard |
| 6,687,362 B1 | 2/2004 | Lindquist et al. |
| 6,687,739 B2 | 2/2004 | Anupam |
| 6,687,745 B1 | 2/2004 | Franco et al. |
| 6,691,162 B1 | 2/2004 | Wick |
| 6,694,353 B2 | 2/2004 | Sommerer |
| 6,697,807 B2 | 2/2004 | McGeachie |
| 6,697,824 B1 | 2/2004 | Bowman-Amuah |
| 6,697,840 B1 | 2/2004 | Godefroid |
| 6,699,125 B2 | 3/2004 | Kirmse et al. |
| 6,701,343 B1 | 3/2004 | Kenyon |
| 6,701,346 B1 | 3/2004 | Klein |
| 6,701,348 B2 | 3/2004 | Sommerer |
| 6,701,351 B1 | 3/2004 | Gann |
| 6,704,727 B1 | 3/2004 | Kravets |
| 6,708,033 B1 | 3/2004 | Linkola et al. |
| 6,708,205 B2 | 3/2004 | Sheldon et al. |
| 6,710,725 B1 | 3/2004 | Soques |
| 6,711,565 B1 | 3/2004 | Subramaniam et al. |
| 6,714,519 B2 | 3/2004 | Luzzatti et al. |
| 6,714,791 B2 | 3/2004 | Friedman |
| 6,714,793 B1 | 3/2004 | Carey et al. |
| 6,721,784 B1 | 4/2004 | Leonard et al. |
| 6,728,357 B2 | 4/2004 | O'Neal et al. |
| 6,731,308 B1 | 5/2004 | Tang et al. |
| 6,732,103 B1 | 5/2004 | Strick et al. |
| 6,732,155 B2 | 5/2004 | Meek |
| 6,732,185 B1 | 5/2004 | Reistad |
| 6,742,127 B2 | 5/2004 | Fox et al. |
| 6,744,764 B1 | 6/2004 | Bigdeliazari et al. |
| 6,747,970 B1 | 6/2004 | Lamb et al. |
| 6,750,881 B1 | 6/2004 | Appelman |
| 6,751,603 B1 | 6/2004 | Bauer et al. |
| 6,754,904 B1 | 6/2004 | Cooper et al. |
| 6,757,365 B1 | 6/2004 | Bogard |
| 6,757,531 B1 | 6/2004 | Haaramo |
| 6,757,682 B1 | 6/2004 | Naimark et al. |
| 6,760,412 B1 | 7/2004 | Loucks |
| 6,760,454 B1 | 7/2004 | Shreve et al. |
| 6,760,580 B2 | 7/2004 | Robinson et al. |
| 6,760,753 B1 | 7/2004 | Ohgushi et al. |
| 6,760,754 B1 | 7/2004 | Isaacs et al. |
| 6,772,188 B1 | 8/2004 | Cloutier |
| 6,781,608 B1 | 8/2004 | Crawford |
| 6,782,414 B1 | 8/2004 | Xue et al. |
| 6,785,554 B1 | 8/2004 | Amerga |
| 6,788,769 B1 | 9/2004 | Waites |
| 6,799,039 B2 | 9/2004 | Wu et al. |
| 6,800,031 B2 | 10/2004 | Di Cesare |
| 6,801,659 B1 | 10/2004 | O'Dell |
| 6,807,423 B1 | 10/2004 | Armstrong et al. |
| 6,807,558 B1 | 10/2004 | Hassett et al. |
| 6,807,562 B1 | 10/2004 | Pennock et al. |
| 6,816,884 B1 | 11/2004 | Summers |
| 6,816,913 B1 | 11/2004 | Liebenow |
| 6,820,054 B2 | 11/2004 | Erell et al. |
| 6,826,284 B1 | 11/2004 | Benesty et al. |
| 6,829,607 B1 | 12/2004 | Tafoya et al. |
| 6,832,245 B1 | 12/2004 | Isaacs et al. |
| 6,834,306 B1 | 12/2004 | Tsimelzon |

(56) References Cited

U.S. PATENT DOCUMENTS

| | | | |
|---|---|---|---|
| 6,839,554 B2 | 1/2005 | McDowell |
| 6,839,735 B2 | 1/2005 | Wong et al. |
| 6,839,737 B1 | 1/2005 | Friskel |
| 6,848,008 B1 | 1/2005 | Sevanto et al. |
| 6,848,542 B2 | 2/2005 | Gailey et al. |
| 6,853,982 B2 | 2/2005 | Smith et al. |
| 6,854,007 B1 | 2/2005 | Hammond |
| 6,856,999 B2 | 2/2005 | Flanagin et al. |
| 6,859,460 B1 | 2/2005 | Chen |
| 6,862,298 B1 | 3/2005 | Smith et al. |
| 6,868,498 B1 | 3/2005 | Katsikas |
| 6,876,970 B1 | 4/2005 | Silver et al. |
| 6,883,019 B1 | 4/2005 | Sengupta et al. |
| 6,895,426 B1 | 5/2005 | Cortright et al. |
| 6,898,626 B2 | 5/2005 | Ohashi |
| 6,901,398 B1 | 5/2005 | Horvitz et al. |
| 6,901,559 B1 | 5/2005 | Blum |
| 6,904,026 B1 | 6/2005 | Tarnanen et al. |
| 6,907,243 B1 | 6/2005 | Patel |
| 6,912,505 B2 | 6/2005 | Linden et al. |
| 6,912,563 B1 | 6/2005 | Parker et al. |
| 6,912,564 B1 | 6/2005 | Appelman et al. |
| 6,917,813 B2 | 7/2005 | Elizondo |
| 6,917,965 B2 | 7/2005 | Gupta et al. |
| 6,920,478 B2 | 7/2005 | Mendiola et al. |
| 6,925,469 B2 | 8/2005 | Headings et al. |
| 6,931,419 B1 | 8/2005 | Lindquist |
| 6,934,367 B1 | 8/2005 | LaPierre et al. |
| 6,952,805 B1 | 10/2005 | Tafoya et al. |
| 6,957,077 B2 | 10/2005 | Dehlin |
| 6,985,943 B2 | 1/2006 | Deryugin et al. |
| 6,990,628 B1 | 1/2006 | Palmer et al. |
| 6,993,325 B1 | 1/2006 | Wasterlid |
| 6,999,566 B1 | 2/2006 | Eason et al. |
| 6,999,959 B1 | 2/2006 | Lawrence et al. |
| 7,003,551 B2 | 2/2006 | Malik |
| 7,003,794 B2 | 2/2006 | Ayre |
| 7,007,008 B2 | 2/2006 | Goel et al. |
| 7,007,228 B1 | 2/2006 | Carro |
| 7,010,312 B1 | 3/2006 | Zechlin |
| 7,016,978 B2 | 3/2006 | Malik et al. |
| 7,020,849 B1 | 3/2006 | Chen |
| 7,031,961 B2 | 4/2006 | Pitkow et al. |
| 7,032,007 B2 | 4/2006 | Fellenstein et al. |
| 7,035,865 B2 | 4/2006 | Doss et al. |
| 7,035,926 B1 | 4/2006 | Cohen et al. |
| 7,039,193 B2 | 5/2006 | Mantegna et al. |
| 7,039,639 B2 | 5/2006 | Brezin et al. |
| 7,043,530 B2 | 5/2006 | Isaacs et al. |
| 7,054,918 B2 | 5/2006 | Poleyn |
| 7,058,036 B1 | 6/2006 | Yu et al. |
| 7,058,690 B2 | 6/2006 | Maehiro |
| 7,058,892 B1 | 6/2006 | MacNaughton et al. |
| 7,062,533 B2 | 6/2006 | Brown et al. |
| 7,065,186 B1 | 6/2006 | Myers et al. |
| 7,068,769 B1 | 6/2006 | Weaver et al. |
| 7,076,504 B1 | 7/2006 | Handel |
| 7,076,545 B2 | 7/2006 | Bates et al. |
| 7,076,546 B1 | 7/2006 | Bates et al. |
| 7,080,018 B1 | 7/2006 | Fox et al. |
| 7,080,139 B1 | 7/2006 | Briggs et al. |
| 7,082,407 B1 | 7/2006 | Bezos et al. |
| 7,089,237 B2 | 8/2006 | Turnbull et al. |
| 7,089,287 B2 | 8/2006 | Bellotti et al. |
| 7,092,952 B1 | 8/2006 | Wilens |
| 7,092,998 B2 | 8/2006 | Frietas |
| 7,096,009 B2 | 8/2006 | Mousseau et al. |
| 7,096,030 B2 | 8/2006 | Huomo |
| 7,096,214 B1 | 8/2006 | Bharat et al. |
| 7,113,803 B2 | 9/2006 | Dehlin |
| 7,117,254 B2 | 10/2006 | Lunt et al. |
| 7,124,123 B1 | 10/2006 | Roskind et al. |
| 7,127,232 B2 | 10/2006 | O'Neil et al. |
| 7,130,956 B2 | 10/2006 | Rao |
| 7,133,506 B1 | 11/2006 | Smith |
| 7,133,834 B1 | 11/2006 | Abelow |
| 7,133,898 B1 | 11/2006 | Malik |
| 7,136,903 B1 | 11/2006 | Phillips |
| 7,139,806 B2 | 11/2006 | Hayes et al. |
| 7,142,642 B2 | 11/2006 | McClelland et al. |
| 7,146,404 B2 | 12/2006 | Kay et al. |
| 7,146,416 B1 | 12/2006 | Yoo et al. |
| 7,162,528 B1 | 1/2007 | Simonoff |
| 7,177,880 B2 | 2/2007 | Ruvolo |
| 7,181,417 B1 | 2/2007 | Langseth et al. |
| 7,181,498 B2 | 2/2007 | Zhu et al. |
| 7,185,059 B2 | 2/2007 | Daniell et al. |
| 7,188,143 B2 | 3/2007 | Szeto |
| 7,188,153 B2 | 3/2007 | Lunt et al. |
| 7,190,956 B2 | 3/2007 | Dorenbosch et al. |
| 7,194,516 B2 | 3/2007 | Giacobbe et al. |
| 7,200,634 B2 | 4/2007 | Mendiola et al. |
| 7,203,507 B2 | 4/2007 | Smith et al. |
| 7,206,814 B2 | 4/2007 | Kirsch |
| 7,209,942 B1 | 4/2007 | Hori et al. |
| 7,209,955 B1 * | 4/2007 | Major ............... G06F 17/30867 340/7.29 |
| 7,212,617 B2 | 5/2007 | Owens et al. |
| 7,218,921 B2 | 5/2007 | Mendiola et al. |
| 7,222,309 B2 | 5/2007 | Chupin et al. |
| 7,231,428 B2 | 6/2007 | Teague |
| 7,231,453 B2 | 6/2007 | Mantegna et al. |
| 7,231,478 B2 | 6/2007 | Leijten |
| 7,237,002 B1 | 6/2007 | Estrada |
| 7,237,011 B1 | 6/2007 | St Pierre |
| 7,240,093 B1 | 7/2007 | Danieli et al. |
| 7,246,371 B2 | 7/2007 | Diacakis et al. |
| 7,257,639 B1 | 8/2007 | Li et al. |
| 7,269,590 B2 | 9/2007 | Hull et al. |
| 7,269,627 B2 | 9/2007 | Knauerhase |
| 7,275,215 B2 | 9/2007 | Werndorfer et al. |
| 7,281,053 B2 | 10/2007 | Mantegna et al. |
| 7,297,110 B2 | 11/2007 | Goyal et al. |
| 7,299,257 B2 | 11/2007 | Boyer et al. |
| 7,305,624 B1 | 12/2007 | Siegel |
| 7,313,760 B2 | 12/2007 | Grossman |
| 7,319,882 B2 | 1/2008 | Mendiola et al. |
| 7,324,826 B2 | 1/2008 | Carey et al. |
| 7,337,219 B1 | 2/2008 | Meenan et al. |
| 7,366,522 B2 | 4/2008 | Thomas |
| 7,370,035 B2 | 5/2008 | Gross et al. |
| 7,370,278 B2 | 5/2008 | Malik et al. |
| 7,383,339 B1 | 6/2008 | Meenan et al. |
| 7,392,306 B2 | 6/2008 | Donner et al. |
| 7,401,098 B2 | 7/2008 | Baker |
| 7,403,942 B1 | 7/2008 | Bayliss |
| 7,406,715 B2 | 7/2008 | Clapper |
| 7,411,939 B1 | 8/2008 | Lamb et al. |
| 7,417,650 B1 | 8/2008 | Horvitz et al. |
| 7,424,510 B2 | 9/2008 | Gross et al. |
| 7,428,580 B2 | 9/2008 | Hullfish et al. |
| 7,428,585 B1 | 9/2008 | Owens et al. |
| 7,454,372 B2 | 11/2008 | Anaya et al. |
| 7,475,113 B2 | 1/2009 | Stolze |
| 7,478,414 B1 | 1/2009 | Glusker et al. |
| 7,499,973 B2 | 3/2009 | Couts et al. |
| 7,509,148 B2 | 3/2009 | Pisutha-Arnond et al. |
| 7,512,407 B2 | 3/2009 | Wu et al. |
| 7,543,243 B2 | 6/2009 | Schwartz et al. |
| 7,552,460 B2 | 6/2009 | Goldman |
| 7,590,696 B1 | 9/2009 | Odell |
| 7,600,032 B2 | 10/2009 | Mantegna et al. |
| 7,603,417 B2 | 10/2009 | Ben-Yoseph |
| 7,603,683 B2 | 10/2009 | Reto |
| 7,613,776 B1 | 11/2009 | Ben-Yoseph |
| 7,624,172 B1 | 11/2009 | Austin-Lane |
| 7,640,306 B2 | 12/2009 | Appelman et al. |
| 7,642,172 B2 | 1/2010 | Austin-Lane |
| 7,653,693 B2 | 1/2010 | Heikes |
| 7,675,903 B2 | 3/2010 | Ozugur et al. |
| 7,680,796 B2 | 3/2010 | Yeh et al. |
| 7,686,693 B2 | 3/2010 | Danieli et al. |
| 7,716,287 B2 | 5/2010 | Appelman et al. |
| 7,725,541 B2 | 5/2010 | Daniell et al. |

(56) References Cited

U.S. PATENT DOCUMENTS

| | | |
|---|---|---|
| 7,725,542 B2 | 5/2010 | Daniell et al. |
| 7,752,273 B2 | 7/2010 | Ito et al. |
| 7,774,410 B2 | 8/2010 | Gang |
| 7,774,711 B2 | 8/2010 | Valeski |
| 7,836,188 B1 | 11/2010 | Dodrill et al. |
| 7,836,194 B2 | 11/2010 | Mantegna et al. |
| 7,899,862 B2 | 3/2011 | Appelman et al. |
| 7,908,327 B2 | 3/2011 | Kucharewski |
| 7,921,368 B2 | 4/2011 | Moody et al. |
| 7,956,739 B2 | 6/2011 | Hong et al. |
| 7,958,212 B1 | 6/2011 | Wong et al. |
| 7,996,527 B2 | 8/2011 | Isaacs et al. |
| 8,001,199 B2 * | 8/2011 | Appelman et al. ............ 709/206 |
| 8,005,919 B2 | 8/2011 | Mehanna |
| 8,015,504 B1 | 9/2011 | Lynch et al. |
| 8,019,834 B2 | 9/2011 | Horvitz et al. |
| 8,055,675 B2 | 11/2011 | Higgins et al. |
| 8,086,672 B2 | 12/2011 | Horvitz |
| 8,090,821 B2 | 1/2012 | Holt et al. |
| 8,117,265 B2 | 2/2012 | Ben-Yoseph |
| 8,122,137 B2 | 2/2012 | Appelman et al. |
| 8,150,922 B2 | 4/2012 | Griffin et al. |
| 8,156,193 B1 | 4/2012 | Odell |
| 8,167,712 B2 | 5/2012 | Sarkar et al. |
| 8,191,001 B2 | 5/2012 | Van Wie et al. |
| 8,224,916 B2 | 7/2012 | Kucharewski |
| 8,316,117 B2 | 11/2012 | Nguyen et al. |
| 8,452,849 B2 | 5/2013 | Mehanna |
| 8,473,572 B1 | 6/2013 | Austin-Lane |
| 8,498,289 B2 | 7/2013 | Castell et al. |
| 8,577,972 B1 | 11/2013 | Heikes |
| 8,812,583 B2 | 8/2014 | Franke |
| 2001/0002469 A1 | 5/2001 | Bates et al. |
| 2001/0003202 A1 | 6/2001 | Mache et al. |
| 2001/0003203 A1 | 6/2001 | Mache |
| 2001/0005861 A1 | 6/2001 | Mousseau et al. |
| 2001/0012286 A1 | 8/2001 | Huna et al. |
| 2001/0013050 A1 | 8/2001 | Shah |
| 2001/0013069 A1 | 8/2001 | Shah |
| 2001/0016823 A1 | 8/2001 | Richards et al. |
| 2001/0018858 A1 | 9/2001 | Dwek |
| 2001/0025280 A1 | 9/2001 | Mandato et al. |
| 2001/0032193 A1 | 10/2001 | Ferber |
| 2001/0034224 A1 | 10/2001 | McDowell et al. |
| 2001/0048735 A1 | 12/2001 | O'Neal |
| 2001/0049636 A1 | 12/2001 | Hudda et al. |
| 2001/0056363 A1 | 12/2001 | Gantz et al. |
| 2002/0002520 A1 | 1/2002 | Gatto |
| 2002/0002586 A1 | 1/2002 | Rafal et al. |
| 2002/0006126 A1 | 1/2002 | Johnson et al. |
| 2002/0006788 A1 | 1/2002 | Knutsson et al. |
| 2002/0006803 A1 | 1/2002 | Mendiola et al. |
| 2002/0007398 A1 | 1/2002 | Mendiola et al. |
| 2002/0010803 A1 | 1/2002 | Oberstein et al. |
| 2002/0016818 A1 | 2/2002 | Kirani et al. |
| 2002/0021307 A1 | 2/2002 | Glenn et al. |
| 2002/0023131 A1 | 2/2002 | Wu et al. |
| 2002/0023132 A1 | 2/2002 | Tornabene et al. |
| 2002/0023147 A1 | 2/2002 | Kovacs et al. |
| 2002/0029224 A1 | 3/2002 | Carlsson |
| 2002/0032729 A1 | 3/2002 | Erickson et al. |
| 2002/0032742 A1 | 3/2002 | Anderson |
| 2002/0035605 A1 | 3/2002 | McDowell et al. |
| 2002/0042830 A1 | 4/2002 | Bose et al. |
| 2002/0046243 A1 | 4/2002 | Morris |
| 2002/0046299 A1 | 4/2002 | Lefeber et al. |
| 2002/0049610 A1 | 4/2002 | Gropper |
| 2002/0049704 A1 | 4/2002 | Vanderveldt et al. |
| 2002/0049751 A1 | 4/2002 | Chen et al. |
| 2002/0049806 A1 | 4/2002 | Gatz et al. |
| 2002/0049847 A1 | 4/2002 | McArdle et al. |
| 2002/0049852 A1 | 4/2002 | Lee et al. |
| 2002/0052921 A1 | 5/2002 | Morkel |
| 2002/0054092 A1 | 5/2002 | Hedloy |
| 2002/0059379 A1 | 5/2002 | Harvey et al. |
| 2002/0059401 A1 | 5/2002 | Austin |
| 2002/0059425 A1 | 5/2002 | Belfore et al. |
| 2002/0059526 A1 | 5/2002 | Dillon et al. |
| 2002/0065828 A1 | 5/2002 | Goodspeed |
| 2002/0065856 A1 | 5/2002 | Kisiel |
| 2002/0065894 A1 | 5/2002 | Dalal et al. |
| 2002/0066036 A1 | 5/2002 | Makineni et al. |
| 2002/0071539 A1 | 6/2002 | Diament et al. |
| 2002/0078077 A1 | 6/2002 | Baumann et al. |
| 2002/0083127 A1 | 6/2002 | Agrawal |
| 2002/0083136 A1 | 6/2002 | Whitten, II |
| 2002/0084888 A1 | 7/2002 | Jin |
| 2002/0087630 A1 | 7/2002 | Wu |
| 2002/0087649 A1 | 7/2002 | Horvitz |
| 2002/0087704 A1 | 7/2002 | Chesnais et al. |
| 2002/0091667 A1 | 7/2002 | Jaipuria et al. |
| 2002/0091936 A1 | 7/2002 | Tema |
| 2002/0095464 A1 | 7/2002 | Meek |
| 2002/0095663 A1 | 7/2002 | Joory |
| 2002/0097856 A1 | 7/2002 | Wullert, II |
| 2002/0103801 A1 | 8/2002 | Lyons |
| 2002/0112181 A1 | 8/2002 | Smith |
| 2002/0112239 A1 | 8/2002 | Goldman |
| 2002/0116461 A1 | 8/2002 | Diacakis et al. |
| 2002/0116463 A1 | 8/2002 | Hart |
| 2002/0116528 A1 | 8/2002 | Vale |
| 2002/0116641 A1 | 8/2002 | Mastrianni |
| 2002/0118809 A1 | 8/2002 | Eisenberg |
| 2002/0119789 A1 | 8/2002 | Friedman |
| 2002/0120687 A1 | 8/2002 | Diacakis et al. |
| 2002/0120697 A1 | 8/2002 | Generous et al. |
| 2002/0120779 A1 | 8/2002 | Teeple et al. |
| 2002/0123328 A1 | 9/2002 | Snip et al. |
| 2002/0123988 A1 | 9/2002 | Dean et al. |
| 2002/0128047 A1 | 9/2002 | Gates |
| 2002/0130904 A1 | 9/2002 | Becker et al. |
| 2002/0133369 A1 | 9/2002 | Johnson |
| 2002/0136390 A1 | 9/2002 | Lang et al. |
| 2002/0137530 A1 | 9/2002 | Karve |
| 2002/0138650 A1 | 9/2002 | Yamamoto et al. |
| 2002/0143565 A1 | 10/2002 | Headings et al. |
| 2002/0144283 A1 | 10/2002 | Headings et al. |
| 2002/0151294 A1 | 10/2002 | Kirby et al. |
| 2002/0154178 A1 | 10/2002 | Barnett |
| 2002/0155826 A1 | 10/2002 | Robinson et al. |
| 2002/0160757 A1 | 10/2002 | Shavit et al. |
| 2002/0160805 A1 | 10/2002 | Laitinen et al. |
| 2002/0165000 A1 | 11/2002 | Fok |
| 2002/0165729 A1 | 11/2002 | Keubert et al. |
| 2002/0169748 A1 | 11/2002 | Macholda |
| 2002/0174050 A1 | 11/2002 | Enyard |
| 2002/0174260 A1 | 11/2002 | Huang |
| 2002/0175953 A1 | 11/2002 | Lin |
| 2002/0178072 A1 | 11/2002 | Gusler et al. |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0184128 A1 | 12/2002 | Holtsinger |
| 2002/0184309 A1 | 12/2002 | Danker et al. |
| 2002/0187794 A1 | 12/2002 | Fostick et al. |
| 2002/0188620 A1 | 12/2002 | Doss et al. |
| 2002/0194378 A1 | 12/2002 | Foti |
| 2002/0199095 A1 | 12/2002 | Bandini et al. |
| 2003/0004855 A1 | 1/2003 | Dutta |
| 2003/0004872 A1 | 1/2003 | Gardi et al. |
| 2003/0006912 A1 | 1/2003 | Brescia |
| 2003/0009385 A1 | 1/2003 | Tucciarone et al. |
| 2003/0009698 A1 | 1/2003 | Lindeman et al. |
| 2003/0014485 A1 | 1/2003 | Banatwala |
| 2003/0018704 A1 | 1/2003 | Polychronidis et al. |
| 2003/0018726 A1 | 1/2003 | Low et al. |
| 2003/0018747 A1 | 1/2003 | Herland et al. |
| 2003/0023681 A1 | 1/2003 | Brown et al. |
| 2003/0023684 A1 | 1/2003 | Brown et al. |
| 2003/0023690 A1 | 1/2003 | Lohtia |
| 2003/0023692 A1 | 1/2003 | Moroo |
| 2003/0023875 A1 | 1/2003 | Hursey |
| 2003/0025824 A1 | 2/2003 | Ishikawa |
| 2003/0028524 A1 | 2/2003 | Keskar |

(56) References Cited

U.S. PATENT DOCUMENTS

| | | |
|---|---|---|
| 2003/0028595 A1 | 2/2003 | Vogt et al. |
| 2003/0028597 A1 | 2/2003 | Salmi |
| 2003/0028884 A1* | 2/2003 | Swart et al. ............... 725/51 |
| 2003/0037110 A1 | 2/2003 | Yamamoto |
| 2003/0037112 A1 | 2/2003 | Fitzpatrick et al. |
| 2003/0037114 A1 | 2/2003 | Nishio et al. |
| 2003/0042306 A1 | 3/2003 | Irwin |
| 2003/0045272 A1 | 3/2003 | Burr |
| 2003/0046097 A1 | 3/2003 | LaSalle et al. |
| 2003/0050916 A1 | 3/2003 | Ortega |
| 2003/0050976 A1 | 3/2003 | Block |
| 2003/0051161 A1 | 3/2003 | Smith et al. |
| 2003/0052915 A1 | 3/2003 | Brown et al. |
| 2003/0054830 A1 | 3/2003 | Williams et al. |
| 2003/0055831 A1 | 3/2003 | Ryan |
| 2003/0055897 A1 | 3/2003 | Brown et al. |
| 2003/0058478 A1 | 3/2003 | Aoki |
| 2003/0060211 A1 | 3/2003 | Chern |
| 2003/0064422 A1 | 4/2003 | McDevitt |
| 2003/0065721 A1 | 4/2003 | Roskind |
| 2003/0078981 A1 | 4/2003 | Harms et al. |
| 2003/0078987 A1 | 4/2003 | Serebrennikov et al. |
| 2003/0079024 A1 | 4/2003 | Hough et al. |
| 2003/0081001 A1 | 5/2003 | Munro |
| 2003/0083046 A1 | 5/2003 | Mathis |
| 2003/0086438 A1 | 5/2003 | Laumen et al. |
| 2003/0087632 A1 | 5/2003 | Sagi et al. |
| 2003/0088554 A1 | 5/2003 | Ryan |
| 2003/0101226 A1 | 5/2003 | Quine |
| 2003/0101343 A1 | 5/2003 | Eaton et al. |
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer |
| 2003/0110212 A1 | 6/2003 | Lewis |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131060 A1 | 7/2003 | Hartselle et al. |
| 2003/0131061 A1 | 7/2003 | Newton |
| 2003/0131143 A1 | 7/2003 | Myers |
| 2003/0135659 A1 | 7/2003 | Bellotti et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0167308 A1 | 9/2003 | Schran |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174154 A1 | 9/2003 | Yukie et al. |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0185232 A1 | 10/2003 | Moore et al. |
| 2003/0185360 A1 | 10/2003 | Moore et al. |
| 2003/0187813 A1 | 10/2003 | Goldman |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0193967 A1 | 10/2003 | Fenton et al. |
| 2003/0197729 A1 | 10/2003 | Denoue et al. |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212686 A1 | 11/2003 | Chu-Carroll et al. |
| 2003/0212745 A1 | 11/2003 | Caughey |
| 2003/0217109 A1 | 11/2003 | Ordille et al. |
| 2003/0220946 A1 | 11/2003 | Malik |
| 2003/0220976 A1 | 11/2003 | Malik |
| 2003/0222902 A1 | 12/2003 | Chupin et al. |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2004/0001480 A1 | 1/2004 | Tanigawa et al. |
| 2004/0002972 A1 | 1/2004 | Pather et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0010808 A1 | 1/2004 | deCarmo |
| 2004/0017396 A1 | 1/2004 | Werndorfer et al. |
| 2004/0019612 A1 | 1/2004 | Tyra et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1 | 2/2004 | Creswell et al. |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0059708 A1 | 3/2004 | Dean et al. |
| 2004/0059781 A1 | 3/2004 | Yoakum et al. |
| 2004/0059942 A1 | 3/2004 | Xie |
| 2004/0061716 A1 | 4/2004 | Cheung et al. |
| 2004/0064586 A1 | 4/2004 | Weigand |
| 2004/0073643 A1 | 4/2004 | Hayes et al. |
| 2004/0076272 A1 | 4/2004 | Zafar et al. |
| 2004/0078440 A1 | 4/2004 | Potter et al. |
| 2004/0078445 A1 | 4/2004 | Malik |
| 2004/0081951 A1 | 4/2004 | Vigue et al. |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0098462 A1 | 5/2004 | Horvitz et al. |
| 2004/0098491 A1 | 5/2004 | Costa-Requena et al. |
| 2004/0103156 A1 | 5/2004 | Quillen et al. |

(56) References Cited

U.S. PATENT DOCUMENTS

| | | |
|---|---|---|
| 2004/0107119 A1 | 6/2004 | Ohishi |
| 2004/0111261 A1 | 6/2004 | Chaudhari et al. |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo |
| 2004/0122730 A1 | 6/2004 | Tucciarone et al. |
| 2004/0122810 A1 | 6/2004 | Mayer |
| 2004/0122855 A1 | 6/2004 | Ruvolo |
| 2004/0122901 A1 | 6/2004 | Sylvain |
| 2004/0133564 A1 | 7/2004 | Gross et al. |
| 2004/0137882 A1 | 7/2004 | Forsyth |
| 2004/0141599 A1 | 7/2004 | Tang et al. |
| 2004/0143564 A1 | 7/2004 | Gross et al. |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0153518 A1 | 8/2004 | Seligman et al. |
| 2004/0153832 A1 | 8/2004 | Hasha |
| 2004/0154022 A1 | 8/2004 | Boss et al. |
| 2004/0157586 A1 | 8/2004 | Robinson et al. |
| 2004/0162830 A1 | 8/2004 | Shirwadkar et al. |
| 2004/0171396 A1 | 9/2004 | Carey et al. |
| 2004/0172396 A1 | 9/2004 | Vanska |
| 2004/0172481 A1 | 9/2004 | Engstrom |
| 2004/0176076 A1 | 9/2004 | Uppuluri |
| 2004/0176081 A1 | 9/2004 | Bryham et al. |
| 2004/0177119 A1 | 9/2004 | Mason et al. |
| 2004/0179039 A1 | 9/2004 | Blatter et al. |
| 2004/0183829 A1 | 9/2004 | Kontny et al. |
| 2004/0186738 A1 | 9/2004 | Reisman |
| 2004/0186887 A1 | 9/2004 | Galli et al. |
| 2004/0186909 A1 | 9/2004 | Greenwood |
| 2004/0186989 A1 | 9/2004 | Clapper |
| 2004/0193684 A1 | 9/2004 | Ben-Yoseph |
| 2004/0193722 A1 | 9/2004 | Donovan |
| 2004/0196315 A1 | 10/2004 | Swearigen et al. |
| 2004/0198351 A1 | 10/2004 | Knotts |
| 2004/0199581 A1 | 10/2004 | Kucharewski et al. |
| 2004/0199582 A1 | 10/2004 | Kucharewski et al. |
| 2004/0201624 A1 | 10/2004 | Crawford |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0267604 A1 | 12/2004 | Gross et al. |
| 2005/0004978 A1 | 1/2005 | Reed et al. |
| 2005/0004984 A1 | 1/2005 | Simpson |
| 2005/0004995 A1 | 1/2005 | Stochosky |
| 2005/0009541 A1 | 1/2005 | Ye et al. |
| 2005/0015432 A1 | 1/2005 | Cohen |
| 2005/0021750 A1 | 1/2005 | Abrams |
| 2005/0021854 A1 | 1/2005 | Bjorkner |
| 2005/0027382 A1 | 2/2005 | Krimse et al. |
| 2005/0038856 A1 | 2/2005 | Krishnasamy |
| 2005/0050143 A1 | 3/2005 | Guster et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0066362 A1 | 3/2005 | Rambo |
| 2005/0071251 A1 | 3/2005 | Linden et al. |
| 2005/0076240 A1 | 4/2005 | Appelman |
| 2005/0076241 A1 | 4/2005 | Appelman |
| 2005/0086211 A1 | 4/2005 | Mayer |
| 2005/0086305 A1 | 4/2005 | Koch et al. |
| 2005/0091314 A1 | 4/2005 | Blagsvedt et al. |
| 2005/0096084 A1 | 5/2005 | Pohja et al. |
| 2005/0102202 A1 | 5/2005 | Linden et al. |
| 2005/0108329 A1 | 5/2005 | Weaver et al. |
| 2005/0108341 A1 | 5/2005 | Matthew et al. |
| 2005/0114229 A1 | 5/2005 | Ackley |
| 2005/0114783 A1 | 5/2005 | Szeto |
| 2005/0125559 A1 | 6/2005 | Mutha |
| 2005/0130633 A1 | 6/2005 | Hill et al. |
| 2005/0137963 A1 | 6/2005 | Ricketts et al. |
| 2005/0144133 A1 | 6/2005 | Hoffman et al. |
| 2005/0149606 A1 | 7/2005 | Lyle et al. |
| 2005/0160144 A1 | 7/2005 | Bhatia |
| 2005/0171955 A1 | 8/2005 | Hull et al. |
| 2005/0172001 A1 | 8/2005 | Zaner et al. |
| 2005/0177486 A1 | 8/2005 | Yeager |
| 2005/0181878 A1 | 8/2005 | Danieli et al. |
| 2005/0187020 A1 | 8/2005 | Amaitis et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brien |
| 2005/0208957 A1 | 9/2005 | Knotts |
| 2005/0210120 A1 | 9/2005 | Yukie et al. |
| 2005/0216300 A1 | 9/2005 | Appelman et al. |
| 2005/0216421 A1 | 9/2005 | Barry et al. |
| 2005/0223075 A1 | 10/2005 | Swearigen et al. |
| 2005/0239550 A1 | 10/2005 | Hardisty et al. |
| 2005/0246420 A1 | 11/2005 | Little |
| 2005/0250440 A1 | 11/2005 | Zhou et al. |
| 2005/0251515 A1 | 11/2005 | Reed |
| 2005/0289469 A1 | 12/2005 | Chandler et al. |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0161638 A1 | 7/2006 | Meyer et al. |
| 2006/0168204 A1 | 7/2006 | Appelman et al. |
| 2006/0195554 A1 | 8/2006 | Payne et al. |
| 2006/0242583 A1 | 10/2006 | MacNaughton et al. |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0288077 A1 | 12/2006 | Chen et al. |
| 2007/0011314 A1 | 1/2007 | Horvitz et al. |
| 2007/0092072 A1 | 4/2007 | Jacobs |
| 2007/0112966 A1 | 5/2007 | Eftis et al. |
| 2007/0157098 A1 | 7/2007 | Chupin et al. |
| 2007/0174448 A1 | 7/2007 | Ahuja et al. |
| 2007/0185957 A1 | 8/2007 | Mandalia et al. |
| 2007/0250566 A1 | 10/2007 | Appelman |
| 2008/0008106 A1 | 1/2008 | Boberg et al. |
| 2008/0065767 A1 | 3/2008 | Stachura et al. |
| 2008/0133417 A1 | 6/2008 | Robinson |
| 2008/0215672 A1 | 9/2008 | Kloba et al. |
| 2008/0255989 A1 | 10/2008 | Altberg et al. |
| 2008/0258913 A1 | 10/2008 | Busey |
| 2008/0288604 A1 | 11/2008 | Major et al. |
| 2009/0016499 A1 | 1/2009 | Hullfish |
| 2009/0043844 A1 | 2/2009 | Zimmet et al. |
| 2009/0070306 A1 | 3/2009 | Stroe |
| 2009/0070433 A1 | 3/2009 | Karstens |

(56) References Cited

U.S. PATENT DOCUMENTS

| | | |
|---|---|---|
| 2009/0181702 A1 | 7/2009 | Vargas et al. |
| 2009/0241144 A1 | 9/2009 | LaJoie et al. |
| 2009/0299934 A1 | 12/2009 | Horvitz et al. |
| 2011/0167116 A1 | 7/2011 | Kucharewski |
| 2011/0179117 A1 | 7/2011 | Appelman |
| 2011/0282955 A1 | 11/2011 | Appelman |
| 2012/0005294 A1 | 1/2012 | Weyer et al. |
| 2012/0011110 A1 | 1/2012 | Mehanna |
| 2012/0198012 A1 | 8/2012 | Odell |
| 2012/0233269 A1 | 9/2012 | Ben-Yoseph |
| 2013/0013686 A1 | 1/2013 | Kucharewski |
| 2013/0031638 A1 | 1/2013 | Appelman |
| 2013/0066990 A1 | 3/2013 | Ben-Yoseph |
| 2013/0066991 A1 | 3/2013 | Ben-Yoseph |
| 2013/0066992 A1 | 3/2013 | Ben-Yoseph |
| 2013/0067002 A1 | 3/2013 | Heikes |
| 2013/0067003 A1 | 3/2013 | Heikes |
| 2013/0072239 A1 | 3/2013 | Hullfish |
| 2013/0073580 A1 | 3/2013 | Mehanna |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0097254 A1 | 4/2013 | Appelman |
| 2013/0097255 A1 | 4/2013 | Appelman |
| 2013/0097256 A1 | 4/2013 | Appelman |
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0132376 A1 | 5/2013 | Mehanna |
| 2013/0132482 A1 | 5/2013 | Austin-Lane |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0144938 A1 | 6/2013 | Austin-Lane |
| 2013/0144971 A1 | 6/2013 | Austin-Lane |
| 2013/0145040 A1 | 6/2013 | Mehanna |
| 2013/0151546 A1 | 6/2013 | Mehanna |
| 2013/0159290 A1 | 6/2013 | Mehanna |
| 2013/0159420 A1 | 6/2013 | Appelman |
| 2013/0159440 A1 | 6/2013 | Appelman |
| 2013/0159441 A1 | 6/2013 | Appelman |
| 2013/0159442 A1 | 6/2013 | Appelman |
| 2013/0173722 A1 | 7/2013 | Kucharewski |
| 2013/0173735 A1 | 7/2013 | Austin-Lane |
| 2013/0174060 A1 | 7/2013 | Odell |
| 2013/0198648 A1 | 8/2013 | Austin-Lane |
| 2013/0198649 A1 | 8/2013 | Austin-Lane |
| 2015/0113066 A1 | 4/2015 | Austin-Lane |

FOREIGN PATENT DOCUMENTS

| | | |
|---|---|---|
| CN | 1348296 | 5/2002 |
| CN | 100476805 | 4/2009 |
| DE | 10048653 | 4/2002 |
| EP | 0889660 | 1/1999 |
| EP | 0921666 | 9/1999 |
| EP | 0987894 | 3/2000 |
| EP | 1011243 | 6/2000 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1565845 | 8/2008 |
| GB | 2328835 | 3/1999 |
| GB | 2357932 | 7/2001 |
| GB | 2368747 | 5/2002 |
| JP | 2004-86950 | 3/1992 |
| JP | 2008-123821 | 5/1996 |
| JP | 2009-247334 | 9/1997 |
| JP | 2011-161682 | 6/1999 |
| JP | 2011-328194 | 11/1999 |
| JP | 2000-148795 | 5/2000 |
| JP | 2000-222424 | 8/2000 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 95/22233 | 8/1995 |
| WO | WO 97/10558 | 3/1997 |
| WO | WO 97/34244 | 9/1997 |
| WO | WO 97/37303 | 10/1997 |
| WO | WO 97/46955 | 12/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/46686 | 8/2000 |
| WO | WO 00/47270 | 8/2000 |
| WO | WO 00/60809 | 10/2000 |
| WO | WO 00/79396 | 12/2000 |
| WO | WO 01/06748 | 1/2001 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/78315 | 10/2001 |
| WO | WO 01/80079 | 10/2001 |
| WO | WO 02/03216 | 1/2002 |
| WO | WO 02/19643 | 3/2002 |
| WO | WO 02/28046 | 4/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 2004/046875 | 6/2004 |
| WO | WO 2004/046949 | 6/2004 |
| WO | WO 2004/046970 | 6/2004 |
| WO | WO 2004/088943 | 10/2004 |
| WO | WO 2004/111812 | 12/2004 |
| WO | WO 2004/111871 | 12/2004 |
| WO | WO 2005/010709 | 2/2005 |
| WO | WO 2005/054991 | 6/2005 |
| WO | WO 2005/057329 | 6/2005 |
| WO | WO 2005/086723 | 9/2005 |
| WO | WO 2005/089286 | 9/2005 |
| WO | WO 2006/026908 | 3/2006 |
| WO | WO 2006/066092 | 6/2006 |
| WO | WO 2006/068955 | 6/2006 |

OTHER PUBLICATIONS

U.S. Appl. No. 10/974,969, filed Oct. 28, 2004, Wick.
U.S. Appl. No. 11/023,652, filed Dec. 29, 2004, Odell.

(56) References Cited

OTHER PUBLICATIONS

U.S. Appl. No. 13/361,141, filed Jan. 30, 2012, Appelman et al.
U.S. Appl. No. 13/617,270, filed Sep. 14, 2012, Appelman.
U.S. Appl. No. 13/617,330, filed Sep. 14, 2012, Appelman.
U.S. Appl. No. 13/617,350, filed Sep. 14, 2012, Appelman.
U.S. Appl. No. 13/619,036, filed Sep. 14, 2012, Heikes.
U.S. Appl. No. 13/619,054, filed Sep. 14, 2012, Heikes.
U.S. Appl. No. 13/620,862, filed Sep. 15, 2012, Appelman et al.
U.S. Appl. No. 13/620,863, filed Sep. 15, 2012, Appelman et al.
U.S. Appl. No. 13/620,865, filed Sep. 15, 2012, Appelman et al.
Automated feature of Internet Explorer, www.geocities.com/technofundo/tech/web/ie_autocomplete.html, pp. 1-6, Feb. 18, 2004.
"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
ATMobile Develops Networking-Sensing Instant Messaging, Dec. 8, 1999, Newsbytes, pp. 1-2.
"A Countermeasure to Duplicate-detecting Anti-spam Techniques," Robert J. Hall, AT&T Labs Technical Report 99.9.1, May 1999, Abst. and pp. 1-26.
Adeptra Services Overview; Nov. 7, 2002; adeptra.com ; pp. 1-7.
Adeptra, Features; Nov. 27, 2002; adeptra.com ; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http:// www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.
Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Boyce, Jim, "Microsoft Office Outlook 2003 Inside Out," Microsoft Press (published Nov. 12, 2003), pp. 252.
Brugali, David, "Mediating the Internet," Annals of Software Engineering, vol. 13, pp. 285-308, Jun. 2002, Kluwer Academic Publishers, The Netherlands.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.
Chen, Hao et al. "Bringing Order to the Web: Automatically Categorizing Search Results." Proceedings of the SIGCHI conference on human factors in computing systems. ACM Press. pp. 145-152, New York, Jan. 2000.
Chung-Hwa Herman Rao et al.; iMobile: A Proxy-Based Platform for Mobile Services; Network Services Research Center AT&T Labs-Rsearch, Aug. 2001.
Chung-Hwa-Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
"Creating a Single List of Contacts—Google Scholar" available at http://scholar.google.com/scholar?h1=en&1r=&q=creating+a+single+1ist+1ist+of+contacts&as . . . (Mar. 27, 2007), 10 pages.
CommWorks 8250 Personal Communications Management System; Dec. 11, 2002; commworks.com; pp. 1-2.
CommWorks IP Messaging; Dec. 11, 2002; commworks.com; pp. 1-2.
ConNexus to awareness: extending awareness to mobile users, Tang, J.C. and Yankelovich, N. and Begole, J. and Van Kleek M. and Li, F. and Bhalodia J., Proceedings of the SIGCHI conference on Human factors in computing systems, pp. 221-228, Dec. 2001, ACM Press, New York, NY, USA.
"CrushParty.com: Help," retrieved Jun. 12, 2002 from the World Wide Web: http://www.crushparty.com/help.jsp, 3 pages.
CNET Networks Inc., "PopUp Killer", Sep. 13, 2001, Internet: download. cnet.com/downloads/0-10059-100-6932612 shtml, (3 pages).
Convergys Interactive Alerts Reduce Customer Care Costs and Improve Customer Satisfaction; convergys.com ; pp. 1-2, Jan. 22, 2002.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search For," Search Engine Watch, pp. 1-4, http://searchenginewatch.com/facts/searches.html (visited Feb. 13, 2003).
"Degrees of Separation Email Spam Protection", Halfbakery: Degrees of Separation Email Spam Protection, reprinted from http://halfbakery.com/idea/Degrees-20 of -20Separation-20Email-20Spam-20Protecti . . . printed on Mar. 1, 2004 (3 pages).
"Denied Database for KnockKnock," http://www.knockmail coml support/denydatabase.html, pp. 1, as accessed on Dec. 4, 2003.
"Email Server Control for KnockKnock," http://www.knockmail.com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 20-25, 2002, CHI, Minneapolis, Minnesota, vol. 4, Issue 1, pp. 447-454.
Global Solutions Directory; Nov. 7, 2002; softwaresibm.com ; pp. 1-5.
Google Zeitgeist—Search patterns, trends, and surprises according to Google, Jan. 2003, pp. 1-2, http://www.google.com/press/zeitgeist.html (visited Feb. 13, 2003).
G. Held, "Instant Messaging Finds its Voice", Network Magazine, May 2001, INSPEC p. 5.
G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Issacs, E. and

(56) References Cited

OTHER PUBLICATIONS

Walendowski A.m and Ranganathan, D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know WhetherYou Sizzle or Fizzle, Marino, Jul. 11, 2001, Florida Times Union, p. C.1. (2 total pages).
Home-tribe.net, http://washingtondc stribe meUmessage/24434dlb-817b-4580 -aa42 -3bffal5f26a?page=1 , (4 pages), printed from Internet Dec. 13, 2004, message dated Oct. 19, 2003.
http://www.friendster.com , (17 pages), Dec. 2004.
http://www.knockrnail.com/support/newsettings.jpg, as accessed on Dec. 4, 2003.
"Icq.anywhere, Email Features—Email Center—ICQ.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.
Ipipi Frequently Asked Questions; Nov. 6, 2002; ipipi.com ; pp. 1-2.
Ignite Software: Parent Tools Feature Set, "Parent Tools Features," http://www.parent-tools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/allpublic . . . , (visted Jul. 28, 2003).
IBM Lotus Software, Sametime Everyplace Wireless Collaboration that's Fit for e-Business, pp. 1-6, http://www.lotus.com/products.wireless.nsf/allpublic . . . , (visited Jul. 28, 2003).
IM Means Business IEEE Spectrum, Nov. 2002.
imForwards.com—FAQ's; Oct. 21, 2003.
Index of /tarvizo/oldfiles/elips/tnt-2.4, Jul. 2, 2001, TNT, http://web.mit.edu/tarvizo/oldfiles/elips/tnt-2.4/.
Instant messaging in teen life, Grinter, R.E. and Palen, L., Proceedings of the 2002 ACM conference on Computer supported cooperative work, pp. 21-30, Nov. 2002, ACM Press, New York, NY, USA.
Instant Messaging with Mobile Phones to Support Awareness, Mitsuoka, M. and Watanabe, S. and Kakuta, J. and Okuyama, S., pp. 223-230, Jan. 2001, IEEE.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbmn1+0 &adxnnlx=107029 . . . , printed on Nov. 5, 2004 (2 pages).
"Instant Messaging for Gamers," PC Gamer, May 2004, vol. 11, No. 5, (2 pages).
J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
J. Dudley, "Telstra targets Net spammers", news.com.au , Dec. 2, 2003.
Jabber, Inc., Jabber Wireless Gateway Overview, May 2001.
"Jabber" http://www.jabber.com/index.cgi?CONTENTID=9, as accessed on Dec. 4, 2003.
Jennifer B. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, available at http://www.wired.com/culture/lifestyle/news/2003/11/61227?currentPage=al.
Jonathan B Postel, "Simple Mail Transfer Protocol", RFC788, Information Science Institute, Nov. 1981.

Julian Byrne, "My Spamblock was thrwarting UCE address culling programs", news.admin.net-abuse.e-mail, Jan. 19, 1997.
"Knock Settings ServersTab," http://www.knockmail.com/support/advserverset.html, pp. 1-2, as accessed on Dec. 4, 2003.
Komatsu et al., "Text Input with Dynamic Abbreviation Expansion," IPSJ SIG Notes, vol. 2001, No. 87, Sep. 14, 2008, pp. 133-138, in Japanese with a partial English Translation.
Kirk Scott, Ubique's Virtual Places: Communication and interaction on the World Wide Web, 1 page, http://www.w3.org/collabroation/workshop/proceedings/p2.html, (visited Jul. 28, 2003).
Kyungkoo Jun, et al., "Agent-Based Resource Discovery", IEEE (Feb. 2000), 10 pages.
Laliberte et al., "A Protocol for Scalable Group and Public Annotations," Elsevier, Apr. 1995, pp. 911-918.
Leander Kahney, "Will You Buy a Car From This Man?", Oct. 6, 2003, pp. 1-3, available at http://www.wired.com/techbizlmedia/news/2003/10/60703.
"Learning Spam: Simple Techniques for Freely-Available Software," Bart Massey et ai, Computer Science Dept., Portland, OR USA, Apr. 2003, pp. 1-14.
"Lotus Instant Messaging Everyplace FAQ," retrieved Apr. 29, 2004 from the World Wide Web: http://www.lotus.com/products/product4nsf/wdocs/249c6f083166cd3e85256d7300714407, (3 pages).
Lieberman, H., "Letizia: An Agent that Assists Web Browsing", Aug. 20, 1995, pp. 924-929.
"Listserv Control for KnockKnock," http://www.knockmail com/supporUlistservcont.html, pp. 1, as accessed on Dec. 4, 2003.
Luis Felipe Cabrera et al., "Herald: Achieving a Global Event NotificationService", Microsoft Research, May 2001.
M. Castelluccio, "E-mail in Real Time", Strategic Finance, Sep. 1999, INSPEC p. 10.
M. Day, S Aggarwal, G Mohr, J. Vincent, RFC 2279 Instant Messaging/Presence Protocol Requirements, Feb. 2000.
M. Meola et al., "Real-Time Reference Service for the Remote User: From the Telephone and Electronic Mail to Internet Chat, Instant Messaging and Collaborative Software", Reference Librarian, Dec. 1999, INSPEC p. 8.
M. Smith et al.; Conversation Trees and Threaded Chats; Collaboration & Multimedia Group, Microsoft Research, Redmond, WA, Feb. 2000.
"Managing your Addresses in Knockmail," http://www.knockmail.com/supporUmanaddresses.html, pp. 1-2, as accessed on Dec. 4, 2003.
McMurray, Susan, "Shield your children from unsuitable Internet content," http://www.microsoft.com/canada/home/internet&security/2.4.8protectwithparentalcontrolshowtosafeguardyourcomputer.asp#, Microsoft Home Magazine, pp. 1-3, as accessed on Dec. 10, 2003.
Mark Handel et al., "TeamPortal: Providing Team Awareness on the Web", Dec. 2000.
McKendrick, Joseph; "Internet Call Centers: New Era in Customer Service", Feb. 2002; VIO, n2, (4 pages).
Microservices: CommWorks Find Me-Follow Me Application; Dec. 11, 2002; commworks.com; pp. 1-2.
Microservices: CommWorks Message Alert System; Dec. 11, 2002; commworks.com; pp. 1-3.
Microservices: CommWorks Message Delivery System; Dec. 11, 2002; commworks.com; pp. 1-2.
Microsoft PressPass; Nov. 7, 2002; microsoft.com ; pp. 1-9.
Mobile instant messaging through Hubbub, Issacs, E. and Walendowski, A. and Ranganathan, D., Communications of the ACM, vol. 45, No. 9, pp. 68-72, Sep. 2002, ACM Press New York, NY USA.
Midorikawa, et al., "Part 2 Build up a Comfortable Search Environment via Customization by Rules," PC Japan, vol. 7, No. 10, pp. 172-176, in Japanese with a partial English Translation of p. 172, Nov. 2002.
Mozilla, www.mozilla.org/projects/ml/autocomplete, Mar. 13, 2003.
Moore, J. "AOL's Grand Goal; America Online seeks to transform itself into a major Internet player," Information Week, Jul. 31, 1995, lines 7-23, pp. 38-42.

(56) References Cited

OTHER PUBLICATIONS

N. Liew Kwek Sing; AOL ICQ vs. MSN Messenger; Department of Electronic and Computer Science, University of Southampton, Mar. 2003.
Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennslyvannia, USA.) CSCW '00. ACM New York, NY, 79-88.
Nextel Announces On-Line Paging Service Provided by Wireless Services—First Wireless Telephone Messaging Service to Offer Delivery Confirmation, Aug. 12, 1998, NY.
Net Alerts Overview; Nov. 7, 2002; microsoft.com ; pp. 1-3.
Neo Mai, Ken Neo. "Buying and selling on the internet; [Computimes, 2* Edition]." New Straits Times. Kuala Lumpur: Jun. 28, 2001. p. 53.
Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep. 17, 2004 the whole document.
Olsen, Stefanie, "Will instant messaging become instant spamming?,". http://news.com.com/2100-1023 -252765.html?legacy=cnet, Feb. 16, 2001, pp. 1-4.
Ozmosys Enterprise; Nov. 7, 2002; ozmosys.com ; pp. 1-3.
"Pending Database for KnockKnock," http://www.knockmail coml support/penddatabase.html, pp. 1, as accessed on Dec. 4, 2003.
"Preview Pending Emails in KnockMail," http://www.knockmail.com/supporUpreviewemail.html, pp. 1-2, as accessed on Dec. 4, 2003.
"Protect Your Privacy," MSN Features, http://messenger.msn.com/Feature/Privacy.aspx, as accessed on Dec. 2, 2003.
Parviainen et al., "Mobile Instant Messaging", Jul. 3, 2003 IEEE.
Patrice Godefroid et al., "Ensuring Privacy in Presence Awareness Systems: An Automated Verification Approach". Feb. 2000.
Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.
Per E. Pedersen et al.; Using the Theory of Planned Behavior to Explain Teenager's Adoption of Text Messaging Services; Agder University College, Jun. 2002.
Per E. Pedersen; The Adoption of Text Messaging services among Norwegian Teens: Development and Test of an Extended Adoption Model; SNF-Report No. 23/02; Samfunns-Og Naeringslivsforskning As Bergen, Jun. 2002.
Phillips Business Information corporation—Aug. 23, 1999—Instant messaging has emerged as one of the most popular communication mediums in the world.
Prodigy Launches 100 Interest Groups on the World Wide Web; All Sites Have Deep Links to Chat and Newsgroups; Topics Range from "Adventure Travel" and "Astrology" to "Virtual Reality" and "Wrestling", Business Wire, Sep. 27, 1995, 4 Pages.
"Plaxo—Update Your Address Book," Plaxo Contact Networks, reprinted from http://web.archive.org/web/20030218233638/http://www.plaxo.com printed on Nov. 5, 2004 (available on Feb. 18, 2003), (1 page).
"Plaxo", Plaxo, reprinted from http://web.archive.org/web/20041105072256/http://www.plaxo.com/ printed on Nov. 5, 2004 (available on Feb. 14, 2004) (2 pages).
Parent Tools TheUltimate in Monitoring and Controlling AIM "Parent Tools for AIM," http://www.parent-tools.com/screenshots.htm, pp. 1-4, as accessed on Dec. 10, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-Instant -Messaging-20 . . . , pp. 1-4.

"Reflections on Friendster, Trust and Intimacy," Danah Boyd, Ubicomp 2003, Workshop Application for the Intimate Ubiquitous Computing Workshop. Seattle, WA, Oct. 12-15, 2003, (4 pages).
R. Movva & W. Lai, "MSN Messenger Service 1.0 Protocol", Aug. 1999, Internet Draft, http://toolsietf.org/id/draft-movva-msn-messenger-protocol-oo.bct, 28 pages.
Reichard, K., "AOL, ICO to Interoperate—But in a Limited Fashion," Oct. 30, 2002, InstantMessagingPlanet, available at www.instantmessagingplanet.com/public/articie.php/1490771.
Ryze home page, www.ryze.com , Dec. 21, 2003, available at http://web.archivesorg/web/20031221010006/http://ryze .com, printed Mar. 16, 2005, 13 pages.
R. Droms, "Dynamic Host Configuration Protocol", Network Working Group, Oct. 1993.
Richard S. Hall, "The Event Desktop: Supporting Event-Enabled Clients on the Web", Freie University, Berlin. Retrieved on May 21, 2013.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, Apr. 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vol. 38, No. 10, pp. 134-141, Oct. 2000.
SproWuest Wireless Instant messaging (Nov. 22, 1999) InfoSpace.com, pp. 1-2.
"Six Degrees—New Programs Help Companies 'Mine Workers' Relationships for Key Business Prospects," William M. Bulkeley et al., Marketplace, The Wall Street Journal, Aug. 4, 2003, (3 pages).
SM Cherry "Talk is Cheap, Text is Cheaper" (IEEE Spectrum May 2003).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com , (36 pages).
"Support Vector Machines for Spam, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
Solutions Smartdelivery; Nov. 6, 2002; centerpost.com ; pp. 1-2.
"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDM '2001 (IEEE ICDM—2001 Workshop on Text Mining); San Jose, CA, 2001, pp. 1-14, Nov. 2001.

(56) References Cited

OTHER PUBLICATIONS

The Wall Street Journal article "Esniff Ferrets Out Misbehavior By 'Reading' E-Mail, Web Visits," Katherine Lange, interactive.wsj.com, Apr. 27, 2001, Tech Q&A.
The Early Report—The Early Show segment, "Big Brother In The Corner Office," Julie Chen, cbsnews.com/earlyshow/caught/techage/20001228esniff.shtml, Dec. 28, 2000: Tech Age.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"The eSniff Product Overview," eSniff: Define Your e-Boundaries, www.esniff.com/product overview.html, May 15, 2001.
"Text Categorization with Support Vector Machines: Learning with Many Relevant Features," Thorsten Joachims, University of Dortmund, Computer Science Dept., LS-8 Report 23, 1998, (18 paqes), Nov. 27, 1997, revised Apr. 19, 1998.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat—Instant Messaging is Taking Off, and For Some Users It's Nuzzling Out the Phone," Nick Wingfield, Asian WSJ, Sep. 2000, (5 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of AUUG2002, Melbourne, Sep. 4-6, 2002, (17 pages).
Tara Hall, Lotus Developer Domain, "Same Place, Sametime with Chris Price", pp. 1-8, http://www.10.lotus.com/ldd/today.nsf/DisplayForm/ . . . , (Visited Jul. 28, 2003), Sep. 2002.
Teraitech; Nov. 7, 2002; teraitech.com ; 1 page.
Uhara7, "Re. being invisible to all but one person on your list", alt.chat-programs.icq, Feb. 29, 2000.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com ; pp. 1-5, Nov. 2002.
V, Vittore, "The Next Dial Tone? [instant messaging]", Telephony, Oct. 16, 2000, INSPEC p. 8.
VisiblePath webpages, www.visiblepath.org , Dec. 3, 2003, available at http://web. archive.org/web/20031203132211/http://www.visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity—Home, reprinted from http://web.archive.org/web/20030228131435/www.huminity.com/default.php?internationa . . . printed on Nov. 5, 2004 (available on Feb. 2, 2003) (1 page).
WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.
Yiva Hard of Segerstad et al.; Awareness of Presence, Instant Messaging and WebWho; Department of Linguistics, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.

ZeroDegrees home page, www.zerodegrees.com , Jan. 24, 2004, available at http://web.archive.org/web/20040204153037/www.zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
European Search Report, European Application No. 03781972.9-2201, dated Feb. 8, 2008, 5 pages.
Notification of Transmittal of the International Search Report and the Written Opinion of the International Searching Authority for International Application No. PCT/US2004/029291; Dec. 27, 2005; 9 pages.
English translation of an Office Action issued in corresponding Japanese Application No. 2004-570418 on Aug. 7, 2008.
English translation of an Office Action issued in corresponding Japanese Application No. 2004-570418 on Feb. 5, 2009.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (3 pages).
International Search Report issued in International Application No. EP03731244, dated Aug. 30, 2005, (4 pages).
Supplementary European Search Report issued in European Application No. EP05728303, dated Jan. 9, 2009, (4 pages).
Supplementary European Search Report issued in European Application No. 05857099.5-1238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. EP 03811631, 3 pages.
Notification of Transmittal of the International Search Report or the Declaration dated Jun. 23, 2004 for International Application Serial No. PCT/US03/36795.
Office Action issued in Chinese Application No. 200480013443.9, mailed Mar. 6, 2009, 20 pages, including English translation.
Office Action mailed Apr. 21, 2005 for European Application No. 97946924.4-1238, 6 pages.
Office Action mailed May 21, 2008 for European Application No. 97946924.4-1238, 10 pages.
International Search Report and Written Opinion for International Application No. PCT/US05/45630, Dated Oct. 23, 2006.
International Search Report dated Jan. 27, 2005 for International Application No. PCT US2004/009422, International Filing Date Mar. 26, 2004.
International Search Report issued in International Application No. PCT/US03/36795 mailed Jun. 23, 2004, 9 Pages.
International Search Report mailed Dec. 27, 2005 for International Application No. PCT/US2004/29291, filed Sep. 8, 2004.
International Search Report, Application Serial No. PCT/US04/23382, dated Feb. 1, 2007, 12 pages.
International Search Report of PCT/US03/36654 dated Aug. 17, 2004.
International Standard, Information technology—telecommunications and information exchange between systems—private integrated services network—specifications, functional model and information flows—Short message service, ISO/IEC21989, Jul. 1, 2002.
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.
European Office Action, Application Serial No. 03 811 631.5-2201, dated Oct. 4, 2006, 4 pages.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.

(56) References Cited

OTHER PUBLICATIONS

Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/633,636, Oct. 11, 2006, Office Action.
U.S. Appl. No. 10/651,303, Feb. 9, 2007, Office Action.
U.S. Appl. No. 10/651,303, Apr. 28, 2008, Office Action.
U.S. Appl. No. 10/651,303, Oct. 8, 2008, Office Action.
U.S. Appl. No. 10/651,303, May 1, 2009, Office Action.
U.S. Appl. No. 10/651,303, Nov. 27, 2009, Office Action.
U.S. Appl. No. 10/651,303, Mar. 11, 2011, Notice of Allowance.
U.S. Appl. No. 10/715,206, Sep. 27, 2007, Office Action.
U.S. Appl. No. 10/715,206, Jul. 25, 2008, Notice of Allowance.
U.S. Appl. No. 10/715,206, Jan. 27, 2009, Office Action.
U.S. Appl. No. 10/715,206, Aug. 13, 2009, Notice of Allowance.
U.S. Appl. No. 10/715,210, Sep. 27, 2007, Office Action.
U.S. Appl. No. 10/715,210, Apr. 14, 2008, Office Action.
U.S. Appl. No. 10/715,210, May 13, 2009, Office Action.
U.S. Appl. No. 10/715,210, Mar. 29, 2010, Notice of Allowance.
U.S. Appl. No. 10/715,211, Jan. 8, 2008, Office Action.
U.S. Appl. No. 10/715,211, Jul. 11, 2008, Office Action.
U.S. Appl. No. 10/715,211, Nov. 28, 2008, Office Action.
U.S. Appl. No. 10/715,211, Jun. 24, 2009, Office Action.
U.S. Appl. No. 10/715,211, Oct. 2, 2009, Notice of Allowance.
U.S. Appl. No. 10/715,211, Feb. 3, 2010, Office Action.
U.S. Appl. No. 10/715,211, Jul. 14, 2010, Office Action.
U.S. Appl. No. 10/715,211, Oct. 25, 2010, Notice of Allowance.
U.S. Appl. No. 10/715,213, Apr. 26, 2007, Office Action.
U.S. Appl. No. 10/715,213, Oct. 22, 2007, Office Action.
U.S. Appl. No. 10/715,213, Aug. 7, 2008, Office Action.
U.S. Appl. No. 10/715,213, Feb. 5, 2009, Office Action.
U.S. Appl. No. 10/715,213, Aug. 6, 2009, Office Action.
U.S. Appl. No. 10/715,213, Jul. 18, 2013, Office Action.
U.S. Appl. No. 10/715,214, Apr. 20, 2007, Office Action.
U.S. Appl. No. 10/715,214, Oct. 9, 2007, Office Action.
U.S. Appl. No. 10/715,215, Mar. 23, 2007, Office Action.
U.S. Appl. No. 10/715,215, Aug. 20, 2007, Office Action.
U.S. Appl. No. 10/715,215, Nov. 20, 2010, Notice of Allowance.
U.S. Appl. No. 10/715,216, Feb. 12, 2007, Office Action.
U.S. Appl. No. 10/715,216, Jan. 11, 2008, Office Action.
U.S. Appl. No. 10/715,216, Aug. 18, 2009, Office Action.
U.S. Appl. No. 10/723,040, Mar. 14, 2006, Office Action.
U.S. Appl. No. 10/723,040, Jun. 26, 2006, Office Action.
U.S. Appl. No. 10/723,040, Jan. 4, 2007, Office Action.
U.S. Appl. No. 10/723,040, Jun. 4, 2007, Office Action.
U.S. Appl. No. 10/723,040, Oct. 25, 2007, Office Action.
U.S. Appl. No. 10/723,040, May 21, 2008, Notice of Allowance.
U.S. Appl. No. 10/746,230, Mar. 17, 2009, Office Action.
U.S. Appl. No. 10/746,232, Mar. 18, 2009, Office Action.
U.S. Appl. No. 10/747,263, Mar. 5, 2008, Office Action.
U.S. Appl. No. 10/747,263, Sep. 5, 2008, Office Action.
U.S. Appl. No. 10/747,263, Feb. 11, 2009, Notice of Allowance.
U.S. Appl. No. 10/747,263, Jun. 2, 2009, Notice of Allowance.
U.S. Appl. No. 10/747,651, Mar. 5, 2008, Office Action.
U.S. Appl. No. 10/747,651, Feb. 20, 2009, Office Action.
U.S. Appl. No. 10/747,676, Sep. 21, 2007, Office Action.
U.S. Appl. No. 10/747,676, Mar. 31, 2008, Office Action.
U.S. Appl. No. 10/747,678, Sep. 14, 2007, Office Action.
U.S. Appl. No. 10/747,678, Mar. 27, 2008, Office Action.
U.S. Appl. No. 10/747,678, Jun. 12, 2008, Office Action.
U.S. Appl. No. 10/747,678, Dec. 15, 2008, Office Action.
U.S. Appl. No. 10/747,678, Jun. 5, 2009, Notice of Allowance.
U.S. Appl. No. 10/747,678, Jun. 19, 2009, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/747,682, Mar. 18, 2009, Office Action.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/825,617, Jun. 24, 2008, Office Action.
U.S. Appl. No. 10/825,617, Mar. 9, 2009, Notice of Allowance.
U.S. Appl. No. 10/825,617, Sep. 10, 2009, Notice of Allowance.
U.S. Appl. No. 10/895,421, Jan. 9, 2007, Office Action.
U.S. Appl. No. 10/895,421, Jun. 27, 2007, Office Action.
U.S. Appl. No. 10/895,421, Apr. 16, 2008, Office Action.
U.S. Appl. No. 10/895,421, Nov. 19, 2008, Notice of Allowance.
U.S. Appl. No. 10/895,421, Apr. 17, 2009, Notice of Allowance.
U.S. Appl. No. 10/974,969, Mar. 17, 2008, Office Action.
U.S. Appl. No. 10/974,969, Mar. 6, 2009, Office Action.
U.S. Appl. No. 10/974,969, Sep. 8, 2009, Notice of Allowance.
U.S. Appl. No. 10/981,460, Aug. 20, 2008, Office Action.
U.S. Appl. No. 11/015,423, Mar. 2, 2009, Office Action.
U.S. Appl. No. 11/015,424, Mar. 19, 2008, Office Action.
U.S. Appl. No. 11/015,424, May 1, 2009, Office Action.
U.S. Appl. No. 11/015,476, Mar. 2, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/023,652, Aug. 30, 2010, Office Action.
U.S. Appl. No. 11/023,652, May 12, 2011, Office Action.
U.S. Appl. No. 11/023,652, Dec. 8, 2011, Office Action.
U.S. Appl. No. 11/023,652, Sep. 24, 2012, Office Action.
U.S. Appl. No. 11/023,652, Oct. 25, 2013, Office Action.
U.S. Appl. No. 11/079,522, Oct. 16, 2008, Office Action.
U.S. Appl. No. 11/079,522, Apr. 3, 2009, Office Action.
U.S. Appl. No. 11/237,718, Apr. 2, 2009, Office Action.
U.S. Appl. No. 11/408,166, Mar. 18, 2009, Office Action.
U.S. Appl. No. 11/408,166, Oct. 7, 2009, Office Action.
U.S. Appl. No. 11/408,166, Sep. 2, 2010, Office Action.
U.S. Appl. No. 11/408,166, Apr. 13, 2011, Office Action.
U.S. Appl. No. 11/408,166, Oct. 17, 2011, Office Action.
U.S. Appl. No. 11/464,816, Apr. 21, 2009, Office Action.
U.S. Appl. No. 11/574,831, Sep. 18, 2009, Office Action.
U.S. Appl. No. 11/574,831, May 16, 2010, Office Action.
U.S. Appl. No. 11/574,831, Sep. 9, 2010, Office Action.
U.S. Appl. No. 11/574,831, Apr. 15, 2011, Office Action.
U.S. Appl. No. 11/574,831, Oct. 13, 2011, Notice of Allowance.
U.S. Appl. No. 12/236,255, Apr. 2, 2010, Office Action.
U.S. Appl. No. 12/236,255, Sep. 17, 2010, Office Action.
U.S. Appl. No. 12/236,255, Feb. 3, 2011, Office Action.
U.S. Appl. No. 12/548,338, Nov. 9, 2010, Office Action.
U.S. Appl. No. 12/548,338, May 19, 2011, Office Action.
U.S. Appl. No. 12/548,338, Dec. 9, 2011, Notice of Allowance.
U.S. Appl. No. 12/626,099, Sep. 17, 2010, Office Action.
U.S. Appl. No. 12/626,099, Mar. 30, 2011, Notice of Allowance.
U.S. Appl. No. 12/689,699, Feb. 28, 2011, Office Action.
U.S. Appl. No. 12/689,699, Apr. 23, 2012, Office Action.
U.S. Appl. No. 12/689,699, Oct. 9, 2012, Notice of Allowance.
U.S. Appl. No. 12/689,699, Mar. 11, 2013, Office Action.
U.S. Appl. No. 12/689,699, Jun. 18, 2013, Notice of Allowance.
U.S. Appl. No. 13/023,256, Jun. 21, 2011, Office Action.
U.S. Appl. No. 13/023,256, Nov. 23, 2011, Office Action.
U.S. Appl. No. 13/023,256, Apr. 16, 2012, Office Action.
U.S. Appl. No. 13/023,256, Sep. 28, 2012, Office Action.
U.S. Appl. No. 13/023,256, Jun. 21, 2013, Office Action.
U.S. Appl. No. 13/023,256, Nov. 7, 2013, Office Action.
U.S. Appl. No. 13/048,312, Nov. 22, 2011, Office Action.
U.S. Appl. No. 13/048,312, Mar. 13, 2012, Notice of Allowance.
U.S. Appl. No. 13/184,414, Aug. 17, 2012, Notice of Allowance.
U.S. Appl. No. 13/184,414, Nov. 28, 2012, Notice of Allowance.

(56) References Cited

OTHER PUBLICATIONS

U.S. Appl. No. 13/184,414, Jan. 29, 2013, Notice of Allowance.
U.S. Appl. No. 13/189,972, Oct. 29, 2013, Office Action.
U.S. Appl. No. 13/189,972, Jul. 24, 2013, Office Action.
U.S. Appl. No. 13/189,972, Dec. 21, 2012, Office Action.
U.S. Appl. No. 13/189,972, Aug. 22, 2012, Notice of Allowance.
U.S. Appl. No. 13/189,972, May 7, 2012, Office Action.
U.S. Appl. No. 13/189,972, Jan. 5, 2012, Office Action.
U.S. Appl. No. 13/189,972, Sep. 2, 2011, Office Action.
U.S. Appl. No. 13/372,371, May 9, 2013, Office Action.
U.S. Appl. No. 13/507,429, Oct. 25, 2013, Office Action.
U.S. Appl. No. 13/614,640, Oct. 2, 2013, Office Action.
U.S. Appl. No. 13/614,781, Jun. 4, 2013, Office Action.
U.S. Appl. No. 13/614,781, Sep. 12, 2013, Office Action.
U.S. Appl. No. 13/617,270, Sep. 12, 2013, Office Action.
U.S. Appl. No. 13/617,330, Sep. 12, 2013, Office Action.
U.S. Appl. No. 13/619,009, Mar. 7, 2013, Office Action.
U.S. Appl. No. 13/619,009, Sep. 19, 2013, Office Action.
U.S. Appl. No. 13/619,036, Mar. 26, 2013, Office Action.
U.S. Appl. No. 13/619,036, Sep. 16, 2013, Office Action.
U.S. Appl. No. 13/619,054, Mar. 26, 2013, Office Action.
U.S. Appl. No. 13/619,054, Oct. 10, 2013, Office Action.
U.S. Appl. No. 13/620,851, Feb. 8, 2013, Office Action.
U.S. Appl. No. 13/620,853, Feb. 13, 2013, Office Action.
U.S. Appl. No. 13/620,856, Feb. 13, 2013, Office Action.
U.S. Appl. No. 13/361,141, Mar. 19, 2013, Office Action.
U.S. Appl. No. 13/361,141, Aug. 15, 2013, Office Action.
U.S. Appl. No. 13/729,318, Sep. 18, 2013, Office Action.
U.S. Appl. No. 13/755,990, Oct. 2, 2013, Office Action.
U.S. Appl. No. 13/766,779, Oct. 15, 2013, Office Action.
U.S. Appl. No. 12/615,136, filed Nov. 9, 2009, Austin-Lane.
U.S. Appl. No. 13/616,380, filed Sep. 14, 2012, Austin-Lane.
U.S. Appl. No. 13/679,988, filed Nov. 16, 2012, Mantegna et al.
U.S. Appl. No. 14/324,959, filed Jul. 8, 2014, Austin-Lane.
U.S. Appl. No. 14/326,221, filed Jul. 8, 2014, Austin-Lane.
Alan Cohen, "Instant Messaging", Apr. 13, 1999, PC Magazine, PC Labs, 2 pages.
"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
Hodson, O., Perkins, C., Hardman, V. "Skew detection and compensation for Internet audio applications" ICME 2000, Jul. 2000, vol. 3, pp. 1687-1690.
Itakura, F.; Saito, S.; Koike, T.; Sawabe, H.; Nishikawa, M.; An Audio Response Unit Based on Partial Autocorrelation Communications, IEEE Transactions on [legacy, pre-1988], vol. 20, Issue: 4, Aug. 1972, pp. 792-797.
J.S. Erkelens and P.M.T. Broersen, "Bias Propagation in the Autocorrelation Method of Linear Prediction", IEEE Transactions on Speech and Audio Processing, vol. 5, No. 2, pp. 116-119, Mar. 1997.
"Knowledge Pump: Community-centered Collaborative Filtering," published Oct. 27, 1997, authored by Natalie Glance, Damian Arregui, and Manfred Dardenne.
"Making Recommender Systems Work for Organizations," published Apr. 1999 by "Proceedings of PAAM '99," authored by Nathalie Glance, Damian Arregui, and Manfred Dardenne.
Microstrategy, Inc., "MicroStrategy Launches Strategy.com, the World's First Personal Intelligence Network," press release dated Jun. 28, 1999.
"Siteseer: Personalized Navigation for the Web," published Mar. 1997 in Communications of the ACM (vol. 40, No. 3), authored by James Rucker and Marcos J. Polanco.
"WebCobra: An Automated Collaborative Filtering Agent System for the World Wide Web," published Dec. 5, 1997, authored by Steve Nesbitt.
"Yahoo! Messenger Makes the World a Little Smaller, More Informed", pp. 1-2, Jun. 21, 1999.
International Search Report dated Oct. 18, 2001 as received in PCT/US01/40468.
U.S. Appl. No. 09/624,191, Jul. 16, 2003, Office Action.
U.S. Appl. No. 09/624,191, Apr. 7, 2004, Office Action.
U.S. Appl. No. 09/624,191, Feb. 22, 2005, Office Action.
U.S. Appl. No. 09/624,191, Jul. 13, 2005, Office Action.
U.S. Appl. No. 09/624,191, Jan. 30, 2006, Office Action.
U.S. Appl. No. 09/624,191, Jul. 18, 2006, Office Action.
U.S. Appl. No. 09/624,191, May 2, 2007, Office Action.
U.S. Appl. No. 09/624,191, Oct. 14, 2007, Notice of Allowance.
U.S. Appl. No. 09/624,192, Dec. 4, 2003, Office Action.
U.S. Appl. No. 09/624,192, May 13, 2004, Office Action.
U.S. Appl. No. 09/624,192, Jul. 14, 2005, Office Action.
U.S. Appl. No. 09/624,192, Feb. 8, 2006, Office Action.
U.S. Appl. No. 09/624,192, Aug. 23, 2006, Office Action.
U.S. Appl. No. 09/624,192, May 16, 2007, Office Action.
U.S. Appl. No. 09/624,192, Nov. 1, 2007, Office Action.
U.S. Appl. No. 09/624,192, Sep. 5, 2008, Office Action.
U.S. Appl. No. 09/624,192, Mar. 5, 2009, Office Action.
U.S. Appl. No. 09/624,192, Jul. 10, 2009, Notice of Allowance.
U.S. Appl. No. 09/844,656, Jun. 15, 2004, Office Action.
U.S. Appl. No. 09/844,656, Mar. 9, 2005, Office Action.
U.S. Appl. No. 09/844,656, Aug. 12, 2005, Office Action.
U.S. Appl. No. 09/844,656, Dec. 7, 2005, Notice of Allowance.
U.S. Appl. No. 09/845,083, May 25, 2004, Office Action.
U.S. Appl. No. 09/845,083, May 20, 2005, Office Action.
U.S. Appl. No. 09/845,083, Oct. 13, 2005, Office Action.
U.S. Appl. No. 09/845,083, Apr. 6, 2006, Office Action.
U.S. Appl. No. 09/845,083, Jun. 22, 2006, Office Action.
U.S. Appl. No. 09/845,083, Feb. 8, 2007, Office Action.
U.S. Appl. No. 09/845,083, Jun. 1, 2007, Notice of Allowance.
U.S. Appl. No. 09/845,084, Jun. 9, 2004, Office Action.
U.S. Appl. No. 09/845,084, Mar. 30, 2005, Office Action.
U.S. Appl. No. 09/845,084, Oct. 20, 2005, Office Action.
U.S. Appl. No. 09/845,084, Apr. 5, 2006, Office Action.
U.S. Appl. No. 09/845,084, Oct. 19, 2006, Office Action.
U.S. Appl. No. 09/845,084, Feb. 8, 2007, Notice of Allowance.
U.S. Appl. No. 10/715,213, Dec. 6, 2013, Notice of Allowance.
U.S. Appl. No. 11/023,652, Apr. 29, 2014, Office Action.
U.S. Appl. No. 11/760,204, Dec. 26, 2008, Office Action.
U.S. Appl. No. 11/760,204, Jun. 3, 2009, Notice of Allowance.
U.S. Appl. No. 11/868,114, Jun. 15, 2009, Office Action.
U.S. Appl. No. 11/868,114, Jan. 7, 2010, Office Action.
U.S. Appl. No. 11/868,114, Mar. 15, 2010, Notice of Allowance.
U.S. Appl. No. 11/868,114, Jun. 24, 2010, Notice of Allowance.
U.S. Appl. No. 12/615,136, Nov. 26, 2010, Office Action.
U.S. Appl. No. 12/615,136, May 11, 2011, Office Action.
U.S. Appl. No. 12/615,136, Oct. 25, 2011, Office Action.
U.S. Appl. No. 12/615,136, Apr. 12, 2012, Office Action.
U.S. Appl. No. 12/615,136, Dec. 24, 2012, Notice of Allowance.
U.S. Appl. No. 12/615,136, Apr. 24, 2013, Notice of Allowance.
U.S. Appl. No. 13/189,972, Apr. 21, 2014, Office Action.
U.S. Appl. No. 13/189,972, Oct. 2, 2014, Office Action.
U.S. Appl. No. 13/361,141, Jan. 17, 2014, Office Action.
U.S. Appl. No. 13/372,371, Nov. 29, 2013, Office Action.
U.S. Appl. No. 13/372,371, Mar. 26, 2014, Office Action.
U.S. Appl. No. 13/372,371, Jul. 1, 2014, Notice of Allowance.
U.S. Appl. No. 13/442,226, Apr. 14, 2014, Office Action.
U.S. Appl. No. 13/507,429, Mar. 28, 2014, Office Action.
U.S. Appl. No. 13/614,640, Jan. 31, 2014, Office Action.
U.S. Appl. No. 13/614,640, Jun. 11, 2014, Notice of Allowance.
U.S. Appl. No. 13/614,781, Dec. 26, 2013, Office Action.
U.S. Appl. No. 13/614,781, Apr. 2, 2014, Office Action.
U.S. Appl. No. 13/617,270, Apr. 10, 2014, Office Action.
U.S. Appl. No. 13/617,330, Apr. 8, 2014, Office Action.
U.S. Appl. No. 13/617,350, Mar. 27, 2014, Office Action.
U.S. Appl. No. 13/617,350, Oct. 10, 2014, Office Action.
U.S. Appl. No. 13/619,009, Mar. 12, 2014, Notice of Allowance.
U.S. Appl. No. 13/619,009, Apr. 11, 2014, Notice of Allowance.
U.S. Appl. No. 13/619,036, Mar. 21, 2014, Office Action.
U.S. Appl. No. 13/619,054, Apr. 7, 2014, Office Action.

(56) References Cited

OTHER PUBLICATIONS

U.S. Appl. No. 13/620,851, Nov. 29, 2013, Office Action.
U.S. Appl. No. 13/620,851, Apr. 8, 2014, Office Action.
U.S. Appl. No. 13/620,853, Jan. 9, 2014, Office Action.
U.S. Appl. No. 13/620,856, Jan. 9, 2014, Office Action.
U.S. Appl. No. 13/620,862, Jul. 24, 2014, Office Action.
U.S. Appl. No. 13/620,863, Aug. 1, 2014, Office Action.
U.S. Appl. No. 13/620,865, Aug. 6, 2014, Office Action.
U.S. Appl. No. 13/729,318, Feb. 5, 2014, Office Action.
U.S. Appl. No. 13/731,124, Dec. 6, 2013, Office Action.
U.S. Appl. No. 13/731,124, Jun. 30, 2014, Office Action.
U.S. Appl. No. 13/755,990, Jan. 29, 2014, Office Action.
U.S. Appl. No. 13/755,990, May 16, 2014, Notice of Allowance.
U.S. Appl. No. 13/766,779, Apr. 11, 2014, Office Action.
U.S. Appl. No. 13/766,781, Nov. 27, 2013, Office Action.
U.S. Appl. No. 13/766,781, May 6, 2014, Office Action.
U.S. Appl. No. 13/766,785, Nov. 29, 2013, Office Action.
U.S. Appl. No. 13/766,785, May 14, 2014, Office Action.
U.S. Appl. No. 13/766,786, Nov. 27, 2013, Office Action.
U.S. Appl. No. 13/766,786, May 8, 2014, Office Action.
U.S. Appl. No. 13/766,786, Oct. 1, 2014, Office Action.
U.S. Appl. No. 13/616,369, Nov. 6, 2014, Office Action.
U.S. Appl. No. 13/616,380, Nov. 6, 2014, Office Action.
U.S. Appl. No. 13/617,330, Dec. 1, 2014, Office Action.
U.S. Appl. No. 13/766,785, Jan. 30, 2015, Office Action.
U.S. Appl. No. 13/617,270, Dec. 4, 2014, Office Action.
U.S. Appl. No. 13/766,779, Dec. 4, 2014, Office Action.
U.S. Appl. No. 13/766,781, Dec. 24, 2014, Office Action.
U.S. Appl. No. 13/616,359, Sep. 14, 2015, Notice of Allowance.
U.S. Appl. No. 13/616,369, Sep. 3, 2015, Office Action.
U.S. Appl. No. 13/616,380, Aug. 17, 2015, Notice of Allowance.
U.S. Appl. No. 13/617,270, Sep. 24, 2015, Notice of Allowance.
U.S. Appl. No. 13/617,330, Aug. 20, 2015, Office Action.
U.S. Appl. No. 13/617,350, Jul. 27, 2015, Notice of Allowance.
U.S. Appl. No. 13/731,124, Sep. 23, 2015, Office Action.
U.S. Appl. No. 13/766,781, Jul. 9, 2015, Office Action.
U.S. Appl. No. 13/766,785, Sep. 9, 2015, Office Action.
U.S. Appl. No. 13/766,786, Oct. 5, 2015, Office Action.
U.S. Appl. No. 13/800,786, Jul. 28, 2015, Office Action.
U.S. Appl. No. 13/189,972, May 8, 2015, Office Action.
U.S. Appl. No. 13/616,359, Mar. 31, 2015, Office Action.
U.S. Appl. No. 13/617,270, Apr. 17, 2015, Office Action.
U.S. Appl. No. 13/731,124, Mar. 12, 2015, Office Action.
U.S. Appl. No. 13/766,786, Apr. 8, 2015, Office Action.
U.S. Appl. No. 13/800,946, Apr. 22, 2015, Office Action.
U.S. Appl. No. 14/586,850, Apr. 8, 2015, Office Action.
U.S. Appl. No. 13/725,422, Apr. 8, 2015, Office Action.
U.S. Appl. No. 13/189,972, Oct. 22, 2015, Office Action.
U.S. Appl. No. 14/586,850, Oct. 20, 2015, Office Action.
U.S. Appl. No. 60/131,822, filed Apr. 29, 1999, "Methods and Apparatus for Association of Packet Protocol Sessions to Switched Circuit Network Connections".
U.S. Appl. No. 13/616,369, May 20, 2016, Office Action.
U.S. Appl. No. 13/800,946, Jul. 7, 2016, Office Action.
U.S. Appl. No. 14/586,850, Apr. 28, 2016, Office Action.
U.S. Appl. No. 14/586,850, Jun. 17, 2016, Office Action.
U.S. Appl. No. 13/189,972, Mar. 16, 2016, Office Action.
U.S. Appl. No. 13/617,330, Mar. 3, 2016, Office Action.
U.S. Appl. No. 13/731,124, Mar. 25, 2016, Office Action.
U.S. Appl. No. 13/766,781, Feb. 2, 2016, Office Action.
U.S. Appl. No. 13/766,785, Mar. 9, 2016, Office Action.
U.S. Appl. No. 13/766,786, Apr. 22, 2016, Office Action.
U.S. Appl. No. 13/800,786, Mar. 10, 2016, Office Action.
Kuchinskas, Its "DealTime" for Useres With a New Shopping Bot, Jun. 21, 1999, Adweek, http://www.adweek.cominews/advertising/its-dealtime-users-new-shopping-bot-32043.
U.S. Appl. No. 13/189,972, Sep. 23, 2016, Notice of Allowance.
U.S. Appl. No. 13/616,369, Oct. 3, 2016, Office Action.
U.S. Appl. No. 13/617,330, Aug. 11, 2016, Notice of Allowance.
U.S. Appl. No. 13/731,124, Nov. 2, 2016, Office Action.
U.S. Appl. No. 13/766,781, Sep. 21, 2016, Office Action.
U.S. Appl. No. 13/766,785, Oct. 26, 2016, Notice of Allowance.
U.S. Appl. No. 13/766,786, Sep. 22, 2016, Office Action.
U.S. Appl. No. 13/800,946, Oct. 6, 2016, Office Action.
U.S. Appl. No. 14/324,959, Oct. 5, 2016, Office Action.
U.S. Appl. No. 14/326,221, Sep. 30, 2016, Office Action.

\* cited by examiner

SYSTEMS AND METHODS FOR NOTIFICATION DELIVERY

CROSS REFERENCE TO RELATED APPLICATIONS

This application is a continuation of U.S. patent application Ser. No. 13/729,318 filed Dec. 28, 2012, which is a continuation of U.S. patent application Ser. No. 13/189,972 filed Jul. 25, 2011, which is a continuation of U.S. patent application Ser. No. 12/626,099, filed Nov. 25, 2009, now U.S. Pat. No. 8,001,199, which is a continuation of U.S. patent application Ser. No. 10/715,206 filed on Nov. 18, 2003 now U.S. Pat. No. 7,640,306 which claims the benefit of U.S. Provisional Application No. 60/428,234, filed Nov. 22, 2002; and U.S. Provisional Application No. 60/426,806, filed Nov. 18, 2002. Each of the aforementioned applications and patents are hereby incorporated by reference in their entirety.

TECHNICAL FIELD

This disclosure generally relates to systems and methods of reconfiguring an electronic communication to effect an enhanced notification.

BACKGROUND

Online service providers may desire to inform their users of a wide range of information and services regarding, for example, news, weather, auctions, commercial offerings, stocks, banking, sports scores, and entertainment offerings. Many of these services and much of the information may be time sensitive or may benefit from special handling, routing or presentation. The online service providers may communicate their time sensitive offerings using emails or other basic electronic messages. For lack of individual expertise or infrastructure, the electronic messages of the online service providers may lack functionality desirable to communicate with the users in a timely and effective fashion.

SUMMARY

In one general aspect, a system reconfigures an electronic message to effect an enhanced notification using an input interface to receive at least one electronic message created by or on behalf of a message source for delivery to an intended recipient. A matching engine determines whether the electronic message corresponds to a predetermined definition of an enhanced notification. An enhancement engine reconfigures the electronic message to the enhanced notification if stored information related to the intended recipient indicates that the intended recipient is subscribed to receive the enhanced notification.

Implementations may include one or more of the following features. For example, the system may match the electronic message to the predetermined definition of the enhanced notification based on a source and a content of the electronic message. Moreover, the system may enable the intended recipient to access the electronic message by interacting with the enhanced notification.

The system may include a subscriber engine that stores subscriber information associated with the intended recipient. The subscriber engine also may subscribe the intended recipient to the enhanced notification if the intended recipient already is not subscribed.

The information related to the intended recipient may include presence information. The presence information may indicate an online presence, a device presence, and/or a physical presence of the intended recipient at a time at which the enhancement engine is preparing to provide the enhanced notification to the intended recipient. The presence information may indicate a delivery mechanism associated with the online presence of the intended recipient and that the intended recipient physically is present within a predefined distance of that or another delivery mechanism.

The definition of the enhanced notification may include a system definition and a preference of the intended user. The definition of the enhanced notification may include a data structure appropriate to accommodate the system definition and the preference of the intended recipient. The definition of the enhanced notification also may include a delivery definition and a lifespan.

The delivery definition may include, for example, a cascaded delivery definition. The cascaded delivery definition may list several delivery mechanisms that are candidates for delivery (e.g., an email client, an instant messaging client, a mobile device, a desktop computer) and may be used in conjunction with presence information to determine a delivery mechanism that appears available to provide the enhanced notification to the intended recipient without significant delay.

The lifespan includes a time period during which information of the enhanced notification reasonably may be expected usefully to inform an action of the intended recipient. Based on the lifespan, the system may vacate, update, or modify an enhanced notification provided to the intended recipient but not accessed during the lifespan.

For example, the system may provide a plurality of instances of an enhanced notification to the intended recipient based on the lifespan. The system then may sense that an instance of the enhanced notification has been accessed by the intended recipient. In response, the system may vacate or modify other instances of the enhanced notification not yet accessed by the intended recipient.

The system also may include a notification archive to store enhanced notifications (e.g., delivered notifications and/or notifications for which delivery was attempted) and to record historical information related to at least one of the enhanced notifications.

These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings indicate like elements.

DETAILED DESCRIPTION

A message enhancement service enables a provider of enhanced notifications (e.g., notifications having a cascaded delivery or an associated lifespan) to reconfigure an electronic message from a business or other source into an enhanced notification for the intended recipient. By way of illustration, certain businesses generate emails to notify their customers, e.g., an online retailer may send a customer an email to alert the customer that ordered merchandise is available. A notification provider may transform that business' primitive email notification into enhanced notifications (e.g. an alert notification deliverable in various forms to various types of clients). The notification provider may or may not partner with the business that generates the notification emails. In any event, a partner business can leverage the infrastructure of the notification provider to deliver more potent services to its own customers. Moreover, the notification provider independently may provide full-functioned notifications intelligently determined based on emails or other electronic messages received by the intended recipient.

Figure 1:
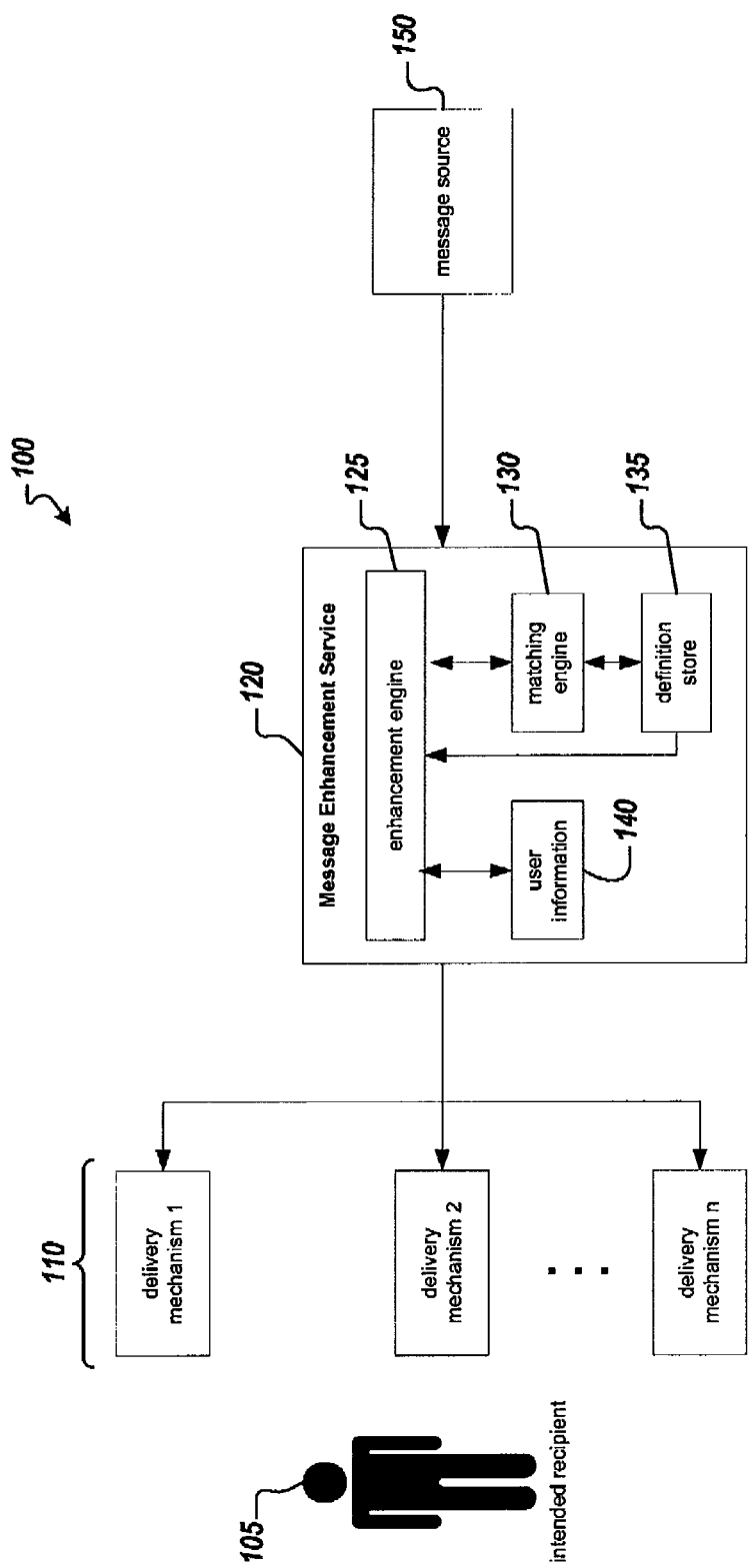
FIG. 1 is a schematic diagram of an electronic communication system capable of reconfiguring an electronic message to effect an enhanced notification.

FIG. 1 shows a generalized system 100 that reconfigures an electronic message directed to intended recipient 105 and provides an enhanced notification based on the electronic message at one or more candidate delivery mechanisms 110. The candidate delivery mechanisms 110 generally may include any device, system, and/or piece of code that relies on another service to perform an operation. The candidate delivery mechanisms 110 may include, for example, a fixed or mobile communication device, whether wired or wireless, and/or a software application, such as, for example, a messaging application or a browser. The candidate delivery mechanisms 110 also may include any protocols (i.e., standards, formats, conventions, rules, and structures) or delivery channels $A_1$-$A_N$ appropriate for corresponding devices or applications of the candidate delivery mechanisms 110. The protocols or delivery channels $A_1$-$A_N$ may include, for example, one or more other systems, such as for example, one or more wired networks and/or one or more wireless networks.

A message enhancement service 120 communicates with a message source 150 and receives the electronic message directed to the intended recipient 105. The message enhancement service 120 includes an enhancement engine 125, a matching engine 130, a definition store 135, and user information 140.

The enhancement engine 125 may be configured to reconfigure the electronic message to the enhanced notification based on interaction with the matching engine 130, the definition store 135, and the user information 140. The matching engine 130 may compare the electronic message to a notification definition of the notification store 135, and may inform the enhancement engine 125 if a correspondence exists. If the electronic message corresponds to a notification definition of the definition store 135, the enhancement engine 125 may access the user information 140 to determine whether the intended recipient 105 is subscribed to the notification. If the intended recipient 105 is subscribed, the enhancement engine 125 uses information of the definition store 135 to reconfigure the electronic message to the enhanced notification. The enhancement engine 125 provides the enhanced notification to the intended recipient 105 at one or more of the candidate delivery mechanisms 110. In any event, the definition store 135 and the user information 140 may be used for either of determining whether to reconfigure, or determining how to reconfigure the electronic message. Moreover, certain implementations may segregate, physically or conceptually, the functions of determining whether to reconfigure and of determining how to reconfigure the electronic message.

The enhancement engine 125 provides the enhanced notification based on an applicable notification definition within the definition store 135 and/or applicable user information 140. An applicable notification definition and/or applicable user information may be identified and accessed based on the identify of the message source or intended recipient or based on attributes of the message. The notification definition may include a delivery definition, for example, a delivery precedence, a hierarchical delivery rule, or any other logical rule or definition that may be used to control delivery of the enhanced notification. The user information, on the other hand, may include information indicating an online presence of the intended recipient 105. The enhancement engine 125 may be configured to determine one or more preferred delivery options based on the delivery definition, the presence information, and/or other information. That is, in general, the enhancement engine 125 may select from among the candidate delivery mechanisms 110 an actual delivery mechanism that is expected to provide the message to the intended recipient 105 without significant delay.

The notification definition also may include a notification lifespan. The lifespan may represent a period during which the enhanced notification is expected to be relevant to the intended recipient 105. Delivery of the notification based on the lifespan enhances the likelihood that the enhanced notification will be provided to the intended recipient 105 at a time at which the notification will be useful. The lifespan may be used to avoid untimely delivery of the notification that may cause the intended recipient to view the notification as not useful and/or as an annoyance. That is, in general, the enhancement engine 125 provides the enhanced notification to the intended recipient 105 only while the enhanced notification is expected to be relevant based on the notification lifespan included in an applicable notification definition.

The message source 150 typically may include any source of an electronic message. The message source 150 may employ one or more protocols to transfer information internally or to communicate the electronic message to the message enhancement service 120.

Both the message enhancement service 120 and the message source 150 further may include various mechanisms for delivering voice and/or non-voice data. The various mechanisms may include, for example, any applications, protocols, devices, or networks used to facilitate communication of electronic data. Both the message enhancement service 120 and the message source 150 also may include or be included in a general-purpose or a special-purpose computer, a local area network, and/or a wide area network. The response to and execution of instructions received by the message enhancement service 120, the message source 150, or any of their components (collectively the system services), may be controlled by, for example, a program, a piece of code, an instruction, a device, a computer system, or a combination thereof, for independently or collectively instructing the system services to interact and operate as described herein.

Figure 2:
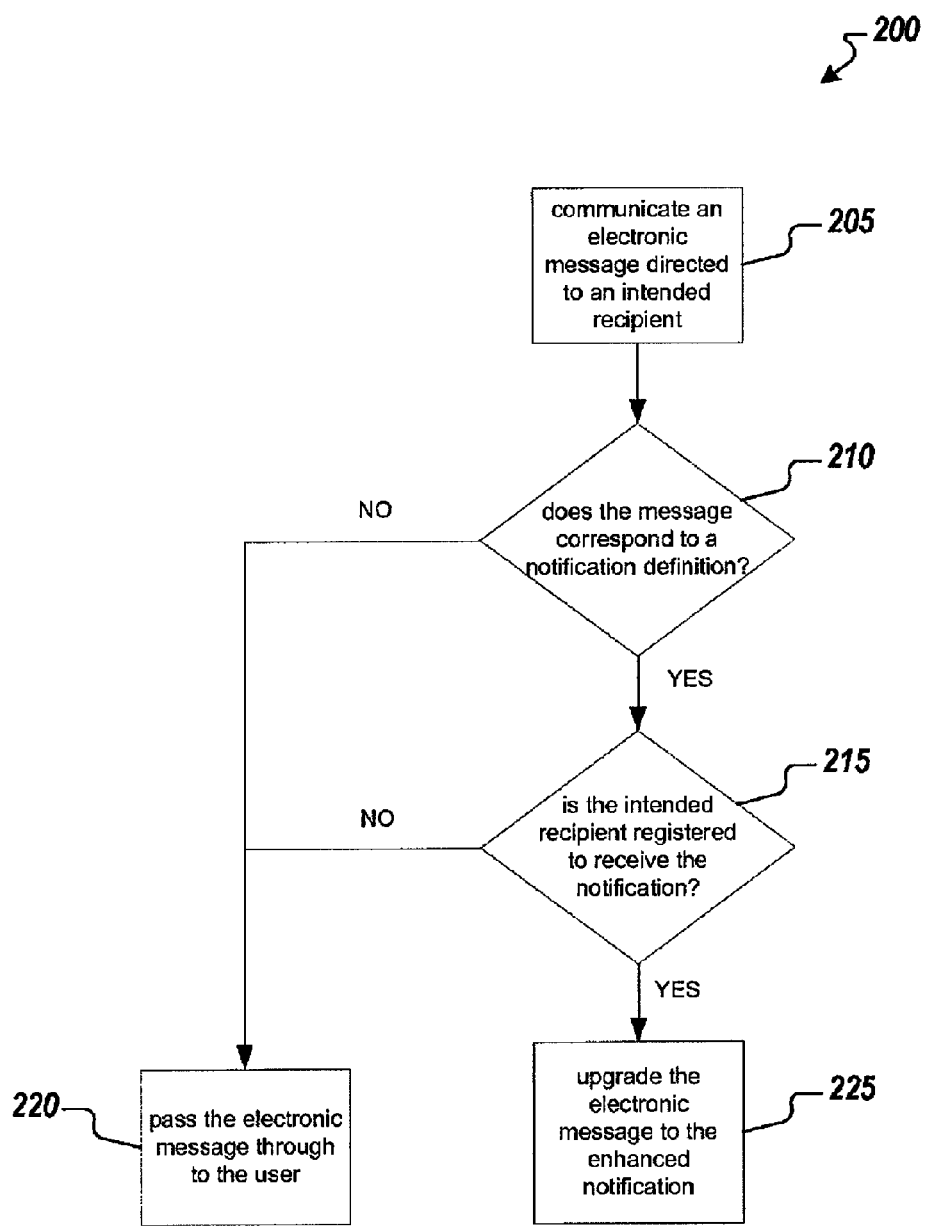
FIG. 2 is a flow diagram of a process implementable by the electronic communication system of FIG. 1.

FIG. 2 illustrates a flow diagram of a process 200 implementable by, for example, the system 100 of FIG. 1 to deliver an enhanced notification to the intended recipient of the electronic message. The message source 150 communicates to the message enhancement service 120 an electronic message to be directed to the intended recipient 105 (step 205). The message enhancement service 120 may use the matching engine 130 and the notification definition 135 to determine whether the electronic message corresponds to the notification definition (step 210). If there is correspondence, the message enhancement service 120 uses the user information 140 to determine whether the intended recipient 105 is registered to receive the enhanced notification (step 215). If these conditions are not satisfied, the electronic message is not reconfigured and is communicated through to the intended recipient 105 (step 220). Otherwise, the message enhancement service 220 reconfigures the electronic message to an enhanced notification and provides the enhanced notification to the intended recipient 105 according to the notification definition (step 225).

Figure 3:
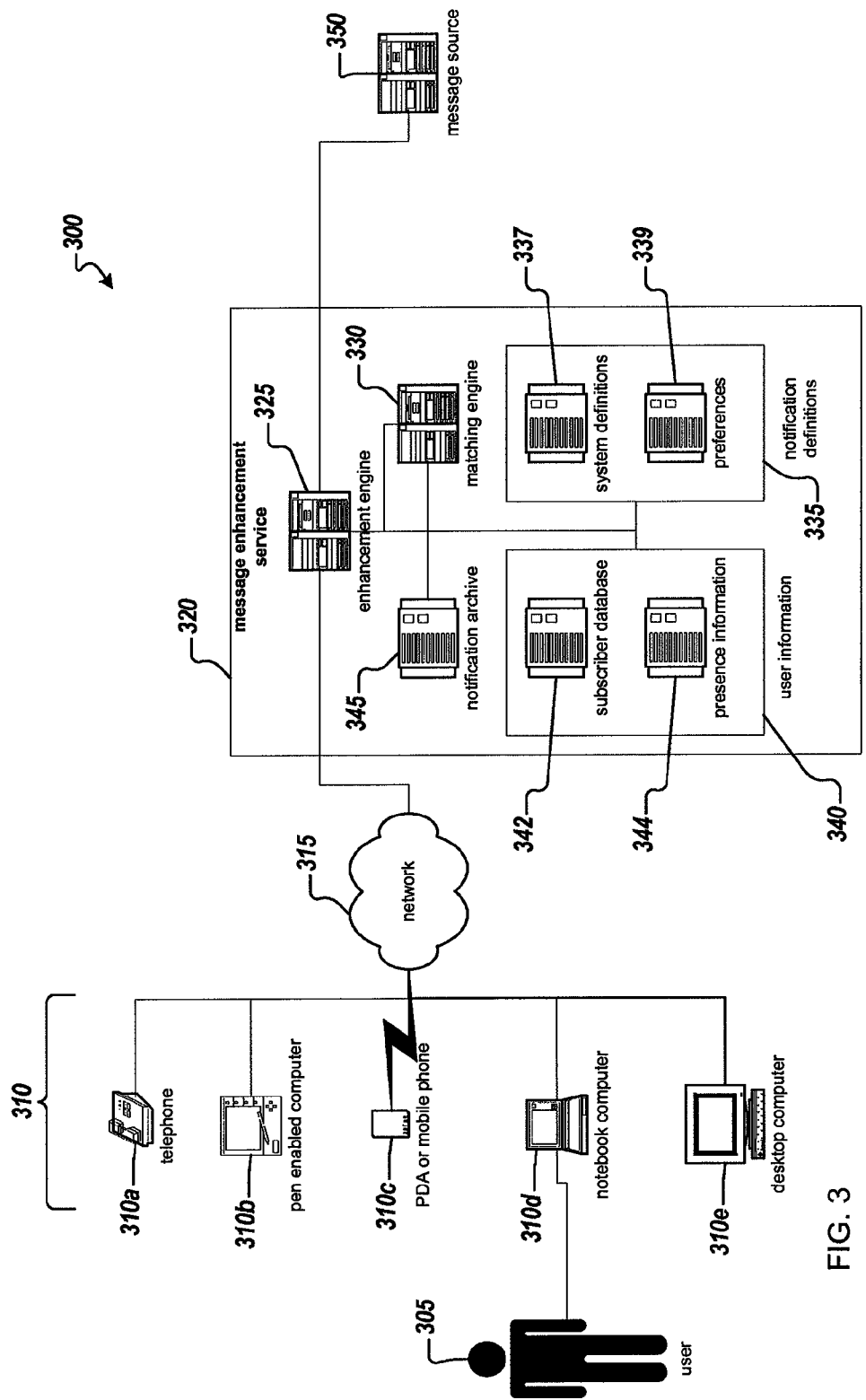
FIG. 3 is a schematic diagram of a system to reconfigure an electronic message to effect an enhanced notification.

Referring to FIG. 3, a generalized notification system 300 reconfigures an electronic message intended for user 305 to provide user 305 with an enhanced notification at one or more candidate delivery mechanisms 310. The notification includes enhanced features, such as, for example, cascaded delivery, an associated lifespan, or an enhanced presentation. The notification system 300 provides the notification to the delivery mechanisms 310 using a network 315 and a message enhancement service 320. Exemplary components of the notification system 300 are described in greater detail below.

The delivery mechanisms 310 generally are analogous to the candidate delivery mechanisms 110 of FIG. 1. Each delivery mechanism 310 may include any device, system, and/or piece of code that relies on another service to perform an operation. For example, a delivery mechanism 310 may include a device such as a telephone 310a, a pen-enabled computer 310b, a personal digital assistant (PDA) or mobile telephone 310c, a notebook computer 310d, and/or a desktop computer 310e. The delivery mechanisms 310 also or alternatively may include, for example, a Web browser, an email client, a synchronization client (e.g., a calendar synchronization client, or a task list synchronization client), an instant messaging (IM) client, a short message service (SMS) client, a business productivity application (e.g., a word processing program, or a spreadsheet program), and/or an operating system or operating system kernel residing on a device. The delivery mechanisms 310 may be arranged to operate within or in concert with one or more other systems, such as, for example, one or more LANs (local area networks) and/or one or more WANs (wide area networks).

Each of the delivery mechanisms 310 may be accessible to the message enhancement service 320, and the user 305 may access the message enhancement service 320 or another online service using one or more of the delivery mechanisms 310. For example, the user 305 may use the notebook computer 310d to access the message enhancement service 320.

A delivery mechanism 310 may format an enhanced notification received from message enhancement service 320 using a standard protocol, such as, for example, the standard generalized markup language (SGML), the extensible markup language (XML), the hypertext markup language (HTML), the extensible hypertext markup language (XHTML), the compact hypertext markup language (cHTML), the virtual reality markup language (VRML), the wireless markup language (WML), the voice extensible markup language (VXML), a document object model (DOM), or the dynamic hypertext markup language (DHTML). Properly formatted, the enhanced notification may enable the user 305 to interact with or to respond to the enhanced notification.

The notification system 300 also includes a message source 350. The message source 350 typically includes different services and sources of electronic messages, such as, for example, a third party service, an email, a discussion group, a chat room, a news service, a broker service, a banking service, a shopping service, a weather service, the World Wide Web, or an Internet service.

The message source 350 may provide an electronic message as a simple email intended to notify the user 305 of an event or of information. Numerous examples of possible subject matter exist, but, for brevity, only a few of those examples are described here. The electronic message may be based, for example, on a promotional advertisement, an account balance, a portfolio status, a credit status, an online status, information that an order and/or a service is complete, or a message regarding confirmation, cancellation, and/or rescheduling of an appointment. Other examples include, but are not limited to, a weather forecast and/or adverse weather conditions of a particular geographic region; a particular date, holiday and/or other special occasion; an online status of another user; a change to a predetermined web page; or entertainment programming and/or ticket information.

The message source 350 may employ one or more protocols (i.e., standards, formats, conventions, rules, and structures) to transfer information internally or to deliver electronic messages to a user. Protocols employed by the information service 330 may include, for example, the Internet protocol (IP), the transfer connection protocol (TCP), the hypertext transfer protocol (HTTP), the file transfer protocol (FTP), the user datagram protocol (UDP), the layer two tunneling protocol (L2TP) and/or the simple mail transfer protocol (SMTP).

In general, the message enhancement service 320 receives an electronic message from the message source 350 and reconfigures the electronic message to an enhanced notification. Reconfiguring the electronic message may include leaving the source electronic message unchanged while providing additional or alternative delivery options or other features. Reconfiguring the electronic message also may include providing a completely different message that is based on or references the source message. More particularly, the message enhancement service 320 monitors for electronic messages that match enhanced notifications to which the intended recipient is subscribed. The message enhancement service 320 may present the intended recipient with a subscription request when an electronic message matches an enhanced notification to which the intended recipient is not subscribed. If the user 305 desires, the user 305 may use the subscription request to instigate subscription to the enhanced notification, for example, by selecting the subscription request and receiving options responsive thereto.

When an electronic message is reconfigured to an enhanced notification, the message enhancement service 320 may provide the notification to the user 305 based on the lifespan, delivery precedence, or user information. For example, the message enhancement service 320 may deliver the enhanced notification to an email account of the user 305 based on a preference indicated when the user subscribed to the notification. Later, the message enhancement service 320 may detect that the user 305 is online during the lifespan period and may deliver an associated notification to the user 305 using a protocol and/or communication method appropriate for the user 305, for example, a pop-up window. If the user 305 first accesses the notification delivered to the email account (e.g., because the user 305 was reading email when the pop-up window was delivered), the associated redundant pop-up window notification may be automatically vacated, updated or removed. Alternatively, the email alert may be vacated, removed or updated in response to access by the user to the pop-up window. Similarly, messages of other types can be vacated, removed or updated based on user interaction with different messages or with other message types. If the user 305 fails to access a notification during the lifespan period, that notification and/or any related notification may be vacated, removed or updated. In this manner, the message enhancement service 320 may provide the notification to the user 305 with a minimum of delay while not burdening the user with redundant notifications.

The message enhancement service 320 may provide notifications in a certain order based on a delivery urgency. The delivery urgency may be related to notification subject matter and/or time sensitivity (e.g., as measured by lifespan). For example, a delivery urgency may define that a notification for a severe weather alert has a higher delivery urgency than a notification of a baseball score. Similarly, the delivery urgency may define that a notification with only thirty minutes of remaining lifespan has a higher urgency than a notification having 36 hours of remaining lifespan.

The message enhancement service 320 includes an enhancement engine 325 that receives the electronic message from the message source 350 and reconfigures the electronic message to the enhanced notification. The enhancement engine 325, alone or in conjunction with other services, may perform sorting, prioritizing, or other types of organizational processing on the enhanced notification so that the notification is delivered appropriately to the user 305.

More specifically, the enhancement engine 325 reconfigures the electronic message to the enhanced notification based on interaction with the matching engine 330, the notification definitions 335, and the user information 340. The matching engine 330 may compare the electronic message to the notification definitions 335, and may inform the enhancement engine 325 if a correspondence exists. If the electronic message corresponds to a notification definition 335, the enhancement engine 325 accesses the user information 340 to determine whether the user 305 is subscribed to the notification. If the user 305 is subscribed, the enhancement engine 325 uses the notification definition 335 to reconfigure the electronic message to the enhanced notification. The enhancement engine 325 provides the enhanced notification to the user 305 at one or more of the candidate delivery mechanisms 310 (e.g., using a cascaded delivery, or a simultaneous broadcast delivery to a plurality of the delivery mechanisms 310). In general, the enhancement engine 325 uses the user information 340 and the notification definitions 335 to select from among the candidate delivery mechanisms 310 one or more actual delivery mechanisms that are expected to provide the message to the user 305 without significant delay and/or with appropriate emphasis and formatting.

The notification definitions 335 may include system definitions 337 and user preferences 339. The system definitions 337 may be generated by the system or by an administrator of the system. The system definitions 337 may include, for example, definitions of classes of notifications, and/or definitions of each available notification. More specifically, the system definitions 337 may define, in whole, or in part, one or more conditions to be satisfied by the source and/or content of an electronic message before the corresponding enhanced notification will be provided—contingent upon subscription by the user 105. For example, before an electronic message will be reconfigured, the system definitions 337 may require that the electronic message derive from a specific source and/or include specific content.

The system definitions 337 also may define the range of functionality of the enhanced notifications and, hence, the scope of accommodation to user preferences (e.g., a user preference for a function not defined for the system cannot be accommodated). The system definitions also may provide a cascaded delivery definition and/or a lifespan (e.g., by forecasting a time period during which the notification is expected to be useful to a user). The system definitions 337 may make a variety of delivery and/or presentation methods available for selection by the user 305. For example, the system definitions 337 may enable user 305 to select to receive the notification as an instant message, an icon, a pop-up window, a video, a flashing indicator, and/or an audio or tactile alarm. The system definitions 337 also may provide for the enhanced notification to be provided to the user 305 conditioned on presence (online versus offline), and/or conditioned on use by the user 305 or intended delivery to a particular device or device type, for example, a wireless device (e.g., a mobile phone, a PDA, or a pager), a standard telephone, voicemail, and/or email if the user 305 so desires. The system definitions 337 may provide the user with flexibility to be notified in a manner that the user anticipates will most likely provide the notification to the user without significant delay.

The user preferences 339 generally include preferences of the user 305 regarding optional or selectable aspects of the system definitions 337. For example, the user preferences 339 may include a delivery preference of the user 305, a presentation preference of the user 305, or a lifespan preference of the user. The user preferences 339 may also include information to define, in finer detail, the conditions to be satisfied by the source and/or content of an electronic message before the corresponding enhanced notification will be provided.

For example, the user 305 may register for an auction alert. The subscriber engine 342 may record that the user 305 has registered for the auction alert. At registration, the user 305 also may provide notification preferences that will be added to the preferences 339 of the notification definitions 335. The user 305 may indicate that the enhanced auction notification will reconfigure simple email alerts sent to the user 305 by eBay® that relate to online auctions in which the user 305 participates. The auction notification will be delivered according to the cascaded delivery definition but will not be delivered after passage of the lifespan. Moreover, even if delivered, the auction notification may be deleted automatically if the user 305 does not access the auction notification (e.g., by viewing an associated pop-up window, and/or by accessing an associated email or voicemail message) prior to passage of the lifespan.

As another example, the user 305 may subscribe to reconfigure birthday email reminders to enhanced notifications. The message source 350 may provide the email reminders one week prior to the specified birthday and, again, the day before. Having properly subscribed, the email reminders are reconfigured to notifications having enhanced functionality. For example, the subsequent enhanced notification may replace the initial notification if the initial notification has not been accessed already.

Moreover, the user 305 may consider two weeks an upper bound for an acceptable belated birthday wish. As a result, the user 305 may configure the enhanced notifications with appropriate lifetimes. Using the lifespans, the enhanced notifications of the birthday may be removed automatically two weeks following the birthday if the user 305 has not accessed the notifications by that time.

In yet another example, the user 305 may subscribe to reconfigure marketing or sales messages (e.g., SPAM) to enhanced notifications. The enhanced notifications may have an associated short duration lifespan of hours or, perhaps, of a day. The enhanced notifications may provide the user 305 with the opportunity to examine the marketing or sales messages received for subject matter of interest. At the same time, the short lifespan relieves the user 305 of the need to attend to the sales or marketing notifications because each corresponding enhanced notification automatically will be deleted as its short lifespan is expended.

The user information 340 may include a subscriber engine 342 and presence information 344. The subscriber engine 342 may include a record of the enhanced notifications that the user 305 has subscribed to receive. Upon registration to receive an enhanced notification, the user 305 may inform the message enhancement service 320 of preferences regarding that enhanced notification. The message enhancement service 320 may include those preferences in the preferences 339 of the notification definitions 335.

The presence information 344 may include, for example, information indicating an online presence of the user 305 (e.g., information indicating that the user 305 is browsing the web, the user 305 has an active instant messaging session, the user 305 is online using a television, the user 305 is online using a game console, the user 305 is online using a networked radio, or the user 305 currently is active in a chat room discussion). The presence information 344 also may include information indicating a presence of the user at a particular device or a physical presence of the user. The physical presence information may be determined, for example, from a global positioning system associated with the user 305 and may be used to select a delivery mechanism within a predefined range of the intended recipient's physical presence.

The network 315 typically allows direct or indirect communication between the delivery mechanism 310 and the online service 320, irrespective of physical or logical separation. Examples of a network 315 include the Internet, the World Wide Web, WANs, LANs, analog or digital wired and wireless telephone networks (e.g., PSTN, ISDN or xDSL), radio, television, cable, satellite, and/or any other delivery mechanism for carrying data. The network 315 may be secured or unsecured.

Each of the delivery mechanism 310, the network 315, and the message enhancement service 320 may further include various mechanisms for delivering voice and/or non-voice data, such as, for example, the short message service, the wireless application protocol (WAP), the transport connection protocol (TCP), the Internet protocol (IP), the World Wide Web, one or more local area networks, and/or one or more wide area networks. The delivery mechanism 310, the network 315, and the message enhancement service 320 also may include analog or digital wired and wireless telephone networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying voice or non-voice data.

The message enhancement service 320 also may include a notification archive 345. The notification archive 345 may be used to retain versions of each enhanced notification actually provided or for which delivery was attempted but failed. The notification archive 345 also may record with respect to each notification the device or devices to which the notification was delivered or for which delivery failed, and the dates and times of those occurrences. In instances of failed delivery, the notification archive 345 may store information indicative of the cause of failed delivery, such as, for example, that a mailbox full message was received in association with an attempted email notification. The notification archive 345 may enable users, for example, to access a history of notifications for which they were an intended recipient (e.g., notifications of the last week or month) and/or to access archived versions of any past notification provided to them.

The notification archive 345 may include one or more databases that may reside at any appropriate location (e.g., local location, remote location, third party location), and also may reside on any appropriate storage medium 180 such as, for example, a magnetic disc array, or an optical disk array. These databases may be included in a single physical or logical structure, or they may be physically or logically distinct.

One or more other services may be included in the components of notification system 300 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a database, a local area network, and/or a wide area network. In any event, the response to and execution of instructions received by any or all of the system services may be controlled by, for example, a program, a piece of code, an instruction, a device, a computer system, or a combination thereof, for independently or collectively instructing the services to interact and operate as described herein.

Figure 4:
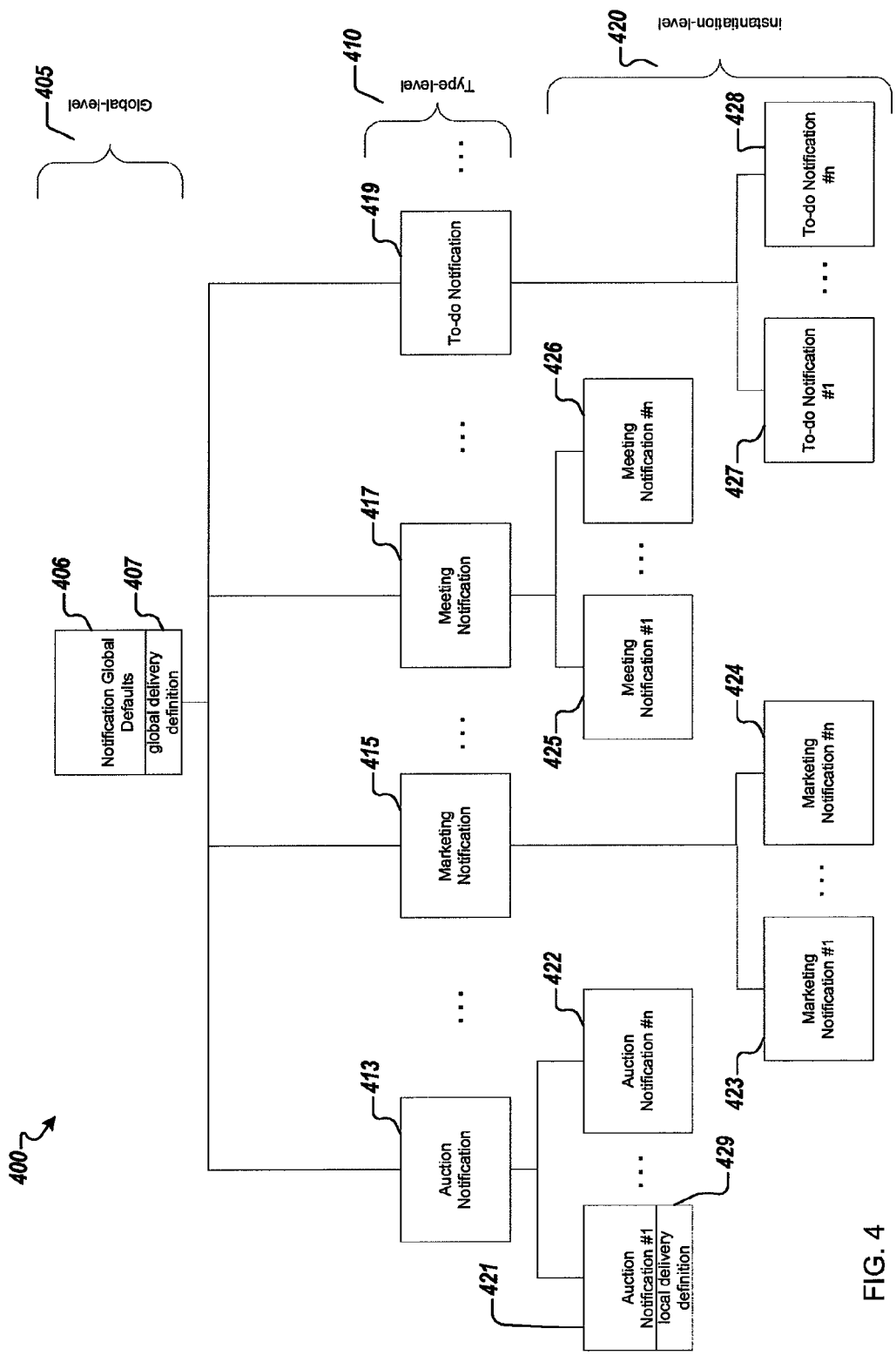
FIGS. 4-6 illustrate an exemplary data structure that may be associated with enhanced notifications achieved using the system of FIG. 3.

FIG. 4. illustrates a notification data structure 400 that may be used by the message enhancement service 320 of FIG. 3 to maintain the notification definitions 335. The notification data structure 400 is structured as a hierarchical tree and provides a logical representation of the notification definitions 335. For example, a highest hierarchical level of the notification data structure 400 includes a global-level 405 having a notification global defaults node 406 representative of a generalized notification.

A lower type-level 410 of the notification data structure 400 further defines notifications according to notification types. For example, as shown, the notifications may include an auction notification type 413, a marketing notification type 415, a meeting notification type 417, and a to-do notification type 419, among others. Still further, the notification data structure 400 includes an instantiation-level 420 to identify and define activated instantiations of each notification type (e.g., the auction notification type 413). For example, the auction notification type 413 may include instantiations of that notification activated by user subscription (e.g., auction notification #1 421 through auction notification #n 422). Other instantiations include marketing notification #1 423 through marketing notification #n 424, meeting notification #1 425 through meeting notification #n 426, and to-do notification #1 427 through to-do notification #n 428.

Each level of the notification data structure 400 may include both system definition information (e.g., system definitions 337) and user preference information (e.g., preferences 339) for the notification definitions 335. For example, the notifications global-level 405 may include system-defined delivery information and user-defined delivery information. To the extent that there is contradiction, the user preference information may preempt the system definition information for a given hierarchical level of the notification data structure 400. Moreover, each node of the notification data structure 400 may be configured to inherit notification definitions 335 from a node of a higher hierarchical level from which the node depends. Stated differently, notification definitions 335 may pass from a higher hierarchical level of the notification data structure 400 to a lower level to provide information missing at the lower level.

For example, the notifications global node 406 includes a global delivery definition 407. Since the auction notification type 413 lacks its own delivery definition, the auction notification type 413 inherits the global delivery definition 407 from the notification global defaults 406. However, auction notification #1 421, an instantiation of the auction notification type 413, includes a local delivery definition 429. To the extent that the local delivery definition 429 is complete, that definition overrides the global delivery definition 406 that it would inherit otherwise. On the other hand, auction notification #n 422, a further instantiation of the auction notification type 413, does not include a delivery definition and inherits the global delivery definition 407 from the auction notification type 413.

Figure 5:
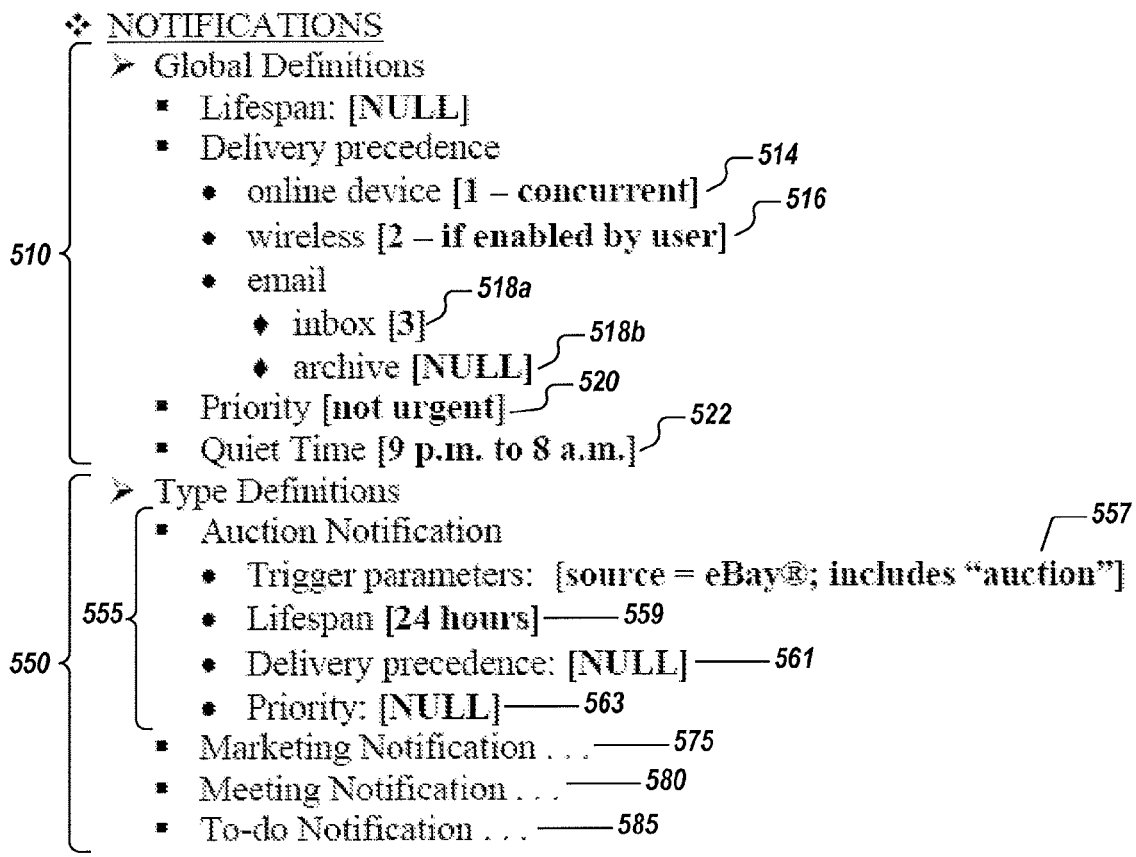
Figure 6:
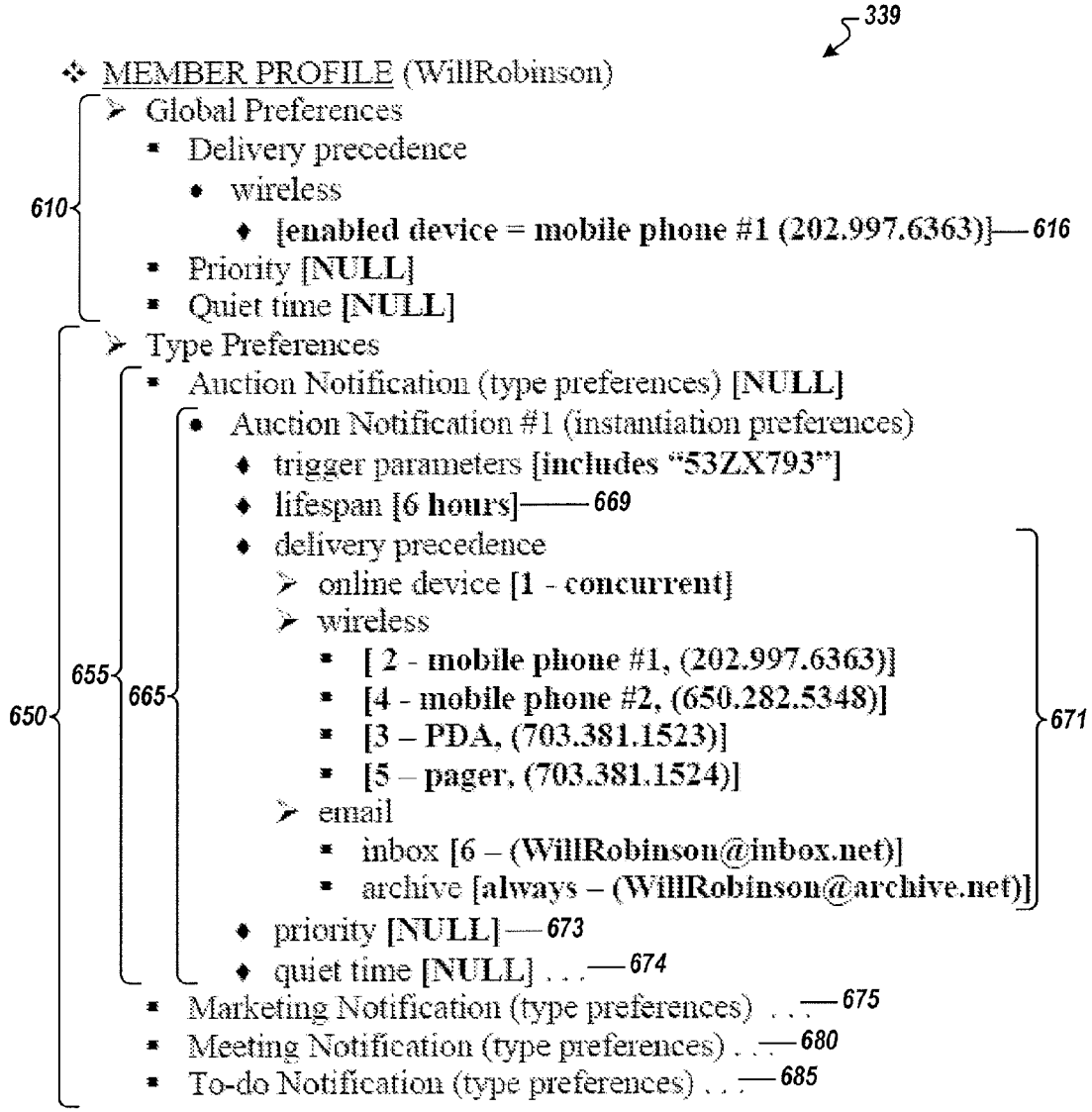

FIGS. 5 and 6 illustrate an implementation of the notification data structure 400 that includes data structures for structuring the system definitions 337 and the user preferences 339, respectively. The exemplary data structures of FIGS. 5 and 6 are similar and parallel each other.

Referring to FIG. 5, the notification data structure 400 includes system definitions 337. The system definitions 337 include global definitions 510 and type definitions 550. The global definitions 510, for example, provide that a notification may include a lifespan. As indicated by the null value, however, the global definitions 510 do not provide a global default lifespan value. The global definitions 510 also indicate a global delivery precedence that controls whether and/or when the enhancement engine 325 provides an enhanced notification to a particular delivery mechanism. More specifically, the global definitions 510 instruct the enhancement engine 325 to select the following delivery mechanisms as delivery recipients in the order of preference shown: (1) an online device 514, if the user is online, (2) a wireless client 516, if wireless delivery is enabled for the user, and (3) an email inbox 518*a*. Lastly, an email archive 518*b* is provided for, but is not activated as a delivery option in this configuration.

Delivery to the online device 514 is designated as "concurrent." Concurrent delivery indicates that the notification will be delivered online if the presence information 344 indicates that the user 305 currently is online, even if the notification already had been or will also be delivered to the user 305 offline. The global definitions also define notification priority 520 to be "not urgent," and that a "quiet time" 522 applies between 9:00 PM and 8:00 AM during which only urgent notifications are delivered to attract the immediate attention of the user 305.

Additionally, the system definitions 500 include type definitions 550 that define, for example, an auction notification type 555, a marketing notification type 575, a meeting notification type 580, and a to-do reminder alert 585. For brevity, only the auction notification type 555 is described in detail as the other notification types are similar in most relevant aspects. The auction notification type 555 defines, for example, trigger parameters 557, which, if satisfied by the electronic message, will cause the electronic message to be reconfigured to an auction notification type 555. In this case, the trigger parameters 557 require that the electronic message be provided by eBay®, and that the content of the electronic message include the term "auction." The auction notification type 555 also defines a twenty-four hour lifespan 559. In addition, although it does not do so here, the auction notification type 555 may define an associated delivery precedence 561 and notification priority 563.

Referring to FIG. 6, the notification data structure 400 also may include a user profile with user preferences 339. Like the system definitions 337, the user preferences 339 include global preferences 610, and type preferences 650. In the illustration of FIG. 6, all of the global preferences are null valued except for wireless delivery preference 616. That preference indicates that mobile phone #1 is enabled generally to receive notifications for WillRobinson. To enable mobile phone #1 to receive notifications, WillRobinson may identify mobile phone #1 as a preferred delivery mechanism and may identify contact information related to mobile phone #1, such as, for example, an associated phone number (202) 997-6363. Although mobile phone #1 is enabled, no associated delivery precedence is provided.

The type preferences 650 may include preferences for various notification types for which WillRobinson has subscribed, such as, for example, the auction notification type 655, the marketing notification type 675, the meeting notification type 680, and/or the to-do notification type 685. For brevity, FIG. 6 provides detail only for the auction notification type 655. The auction notification type 655 includes type-level preferences and a single auction notification instantiation (i.e., auction notification #1 665) having associated instantiation preferences. The type preferences for the auction notification type 655 are null valued.

Nevertheless, at the instantiation level, auction notification #1 665 defines the lifespan as 6 hours, based, for example, on an expectation of the user that the auction will proceed quickly. The auction notification #1 665 also defines the following delivery precedence 671: (1) an online device (if the user is online), (2) a mobile phone #1, (3) a PDA, (4) a mobile phone #2, (5) a pager, and (6) an email inbox. Lastly, an email archive is identified to always receive notification. In addition, the auction notification #1 665 defines the notification priority 673 as "urgent," while leaving "quiet time" 674 undefined as a null value.

Figure 7:
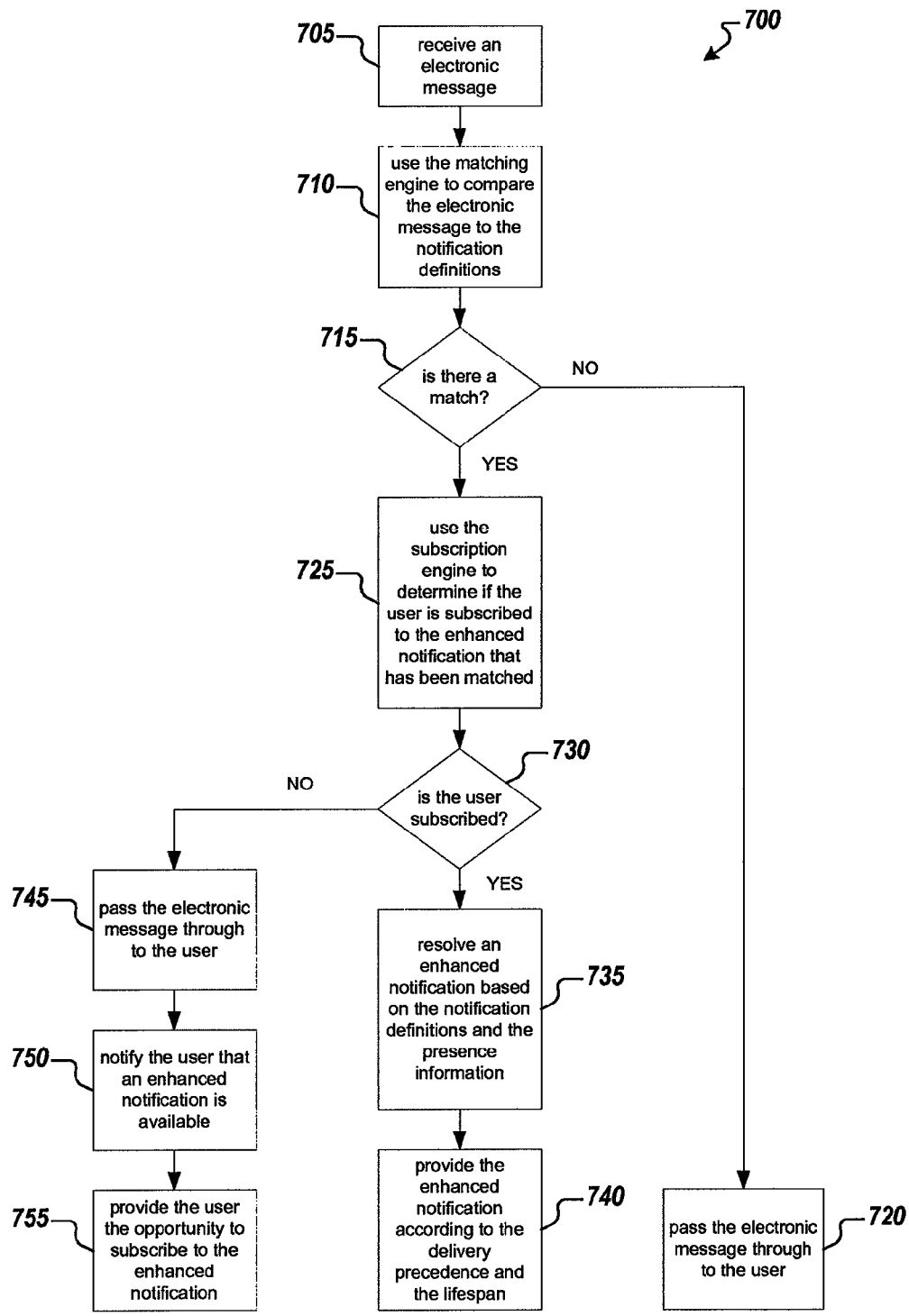
FIGS. 7-9 are flow diagrams illustrating an exemplary process implementable by the system of FIG. 3.

FIG. 7 illustrates a flow diagram of a process 700 implementable by, for example, the system of FIG. 3 to reconfigure an electronic message to an enhanced notification. Initially, the message enhancement service receives an electronic message from a message source (step 705). The enhancement engine uses the matching engine to compare the electronic message to the notification definitions including, for example, the trigger parameters. (step 710). If there is a match (step 715), the enhancement engine uses the subscriber engine to determine whether the user is subscribed to the enhanced notification that has been matched (step 725); otherwise the electronic message is not reconfigured but is passed through to the user (step 720).

If there is a match (step 715) and the user is subscribed to the enhanced notification (step 730), the enhancement engine resolves the enhanced notification (step 735). The enhanced notification is resolved based on the notification definitions, such as, for example, the system definitions and the user preferences, and the presence information (step 735). The enhancement engine provides the enhanced notification to the user at a selected delivery device, for instance, according to a delivery precedence and/or a lifespan of the enhanced notification (step 740).

If the user, however, is not subscribed to the enhanced notification (step 730), the electronic message is not reconfigured but is passed through to the user (step 745). The message enhancement service notifies the user that the enhanced notification is available (step 750), and uses the subscriber engine to provide the opportunity to the user to subscribe to the enhanced notification (step 755).

Figure 8:
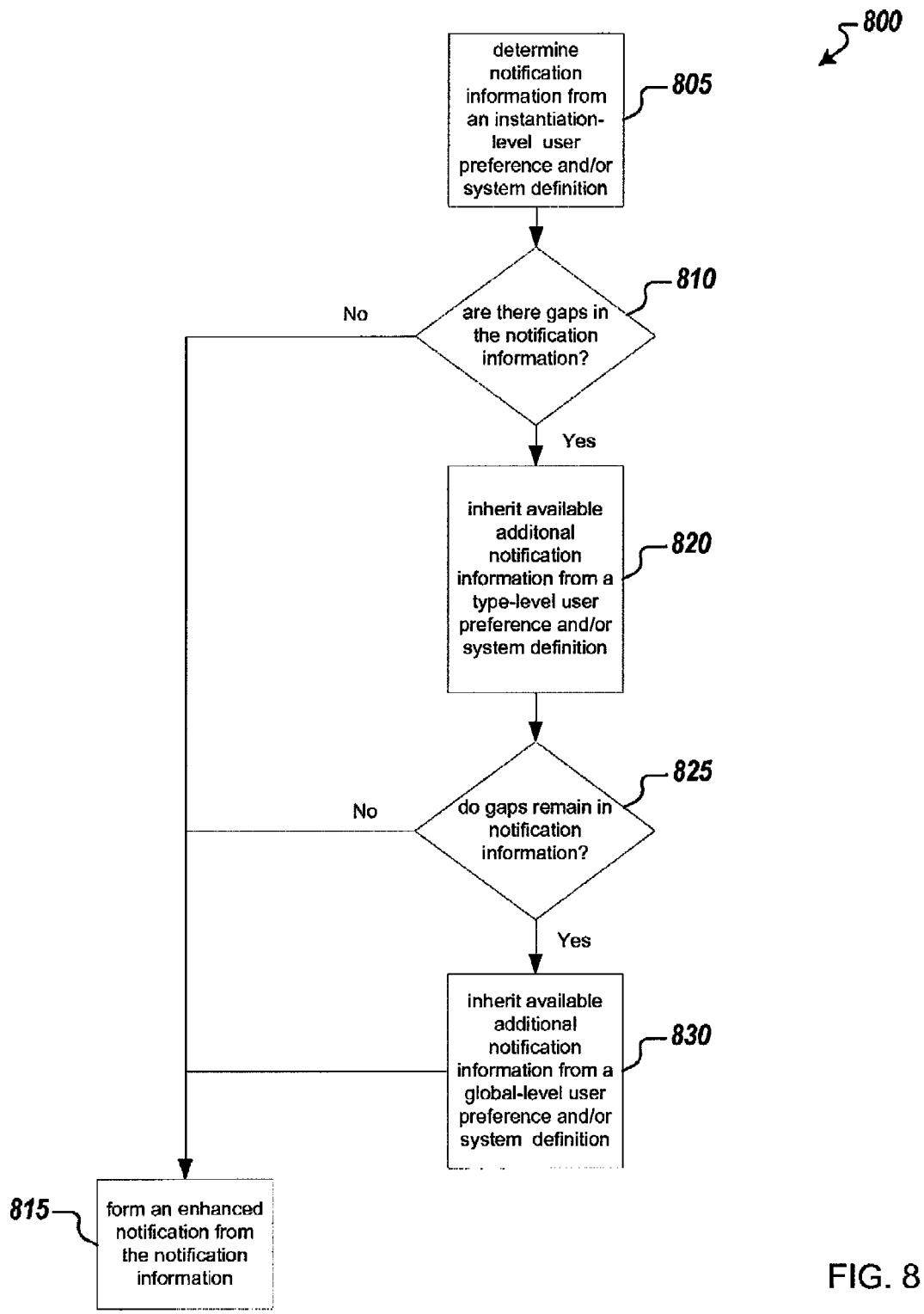

Referring to FIG. 8, an enhanced notification, in whole or in part, may be resolved (step 735 of FIG. 7) using process 800. Resolving the enhanced notification includes determining notification information from an instantiation-level user preference and/or system definition (step 805). If no gaps are identified in the notification information (step 810), the enhanced notification is formed based on the notification information (step 815). Otherwise, if gaps are identified (step 810), additional notification information is inherited from a type-level user preference and/or system definition (step 820). The supplemented notification information is evaluated for completeness again (step 825). If the supplemented notification information is complete, the enhancement engine 325 forms the enhanced notification based on that information (step 815). Otherwise, the enhancement engine 325 forms the enhanced notification (step 815) after the notification information is supplemented further through inheritance based on a global-level user preference and/or system definition (step 840). The enhanced notification may be formed, for example, by converting the relevant notification information into a format or protocol required for delivery.

Figure 9:
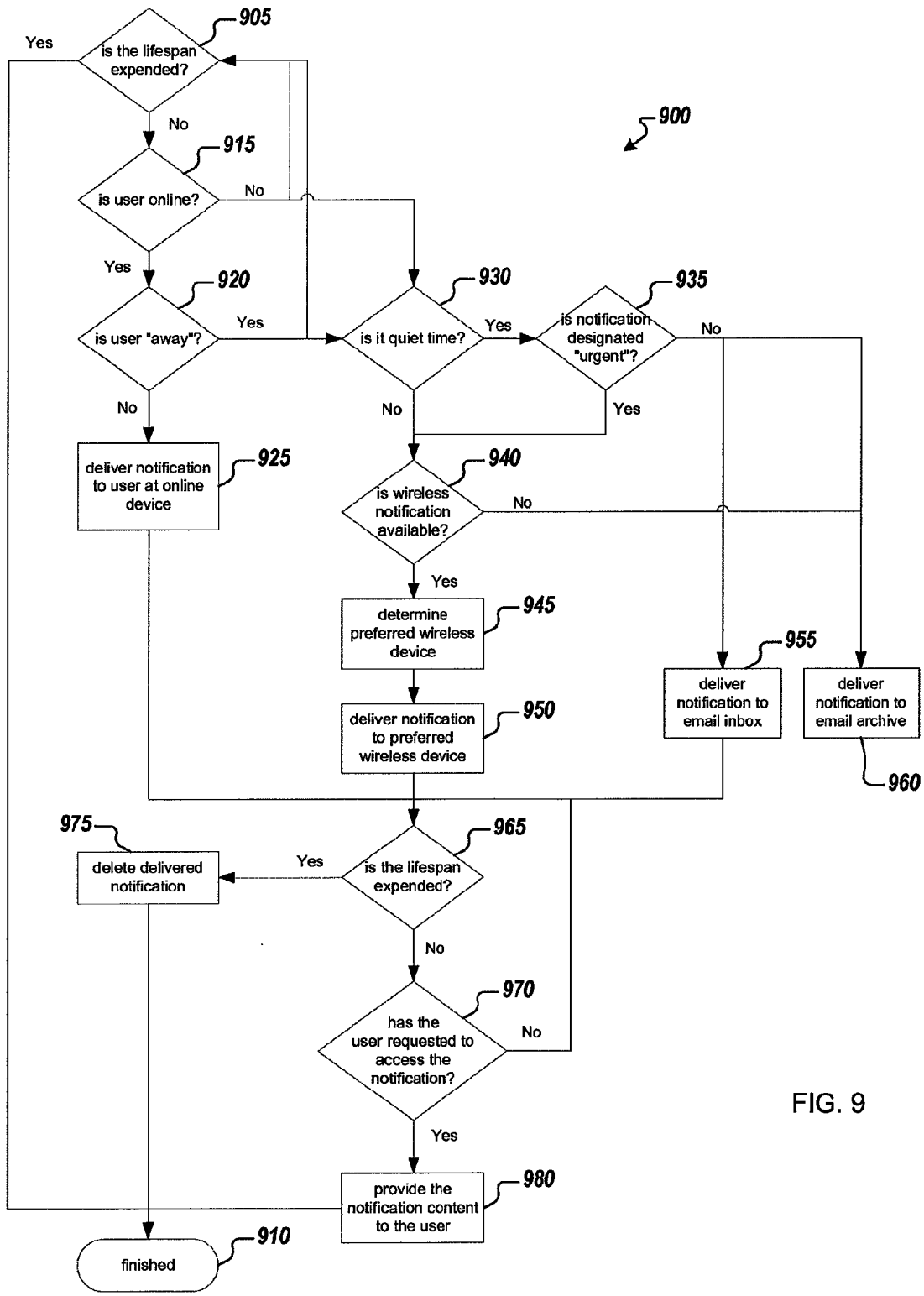

FIG. 9 illustrates a flow diagram of a process 900 implementable by, for example, the system of FIG. 3 to provide to the user an enhanced notification. By way of illustration, the enhanced notification may include a lifespan and a delivery precedence that seeks to notify the user first online, second at a wireless device, and third via email. Providing the enhanced notification includes determining whether the lifespan of the enhanced notification has been expended (step 905). If the lifespan is expended, the message enhancement service 320 does not provide the enhanced notification and the process is finished (step 910).

If the lifespan is not expended (step 905), then the message enhancement service 320 uses the presence information to determine whether the user 305 is online (step 915). If the user 305 is online, the message enhancement service 320 determines further whether the user 305 is away temporarily (e.g., although having an established an online session, the user 305 has marked himself as "away," or the user 305 has engaged in no online activity for a predetermined period of time) (step 920). If the message enhancement service 320 determines that the user 305 is online and is not away from the online delivery mechanism, the message enhancement service 320 delivers the notification to that online delivery mechanism (step 925).

If the message enhancement service 320 determines, however, that the user 305 is not online (step 915), or is away from the online delivery mechanism (step 920), then the message enhancement service 320 determines again if the lifespan is expended (step 905) and continues to monitor for an online presence of the user 305 (steps 915 and 920).

Concurrently with online delivery, the message enhancement service 320 determine whether it presently is "quiet time" for the user 305 (step 930). The message enhancement service 320 also determines whether the enhanced notification is designated as "urgent" (e.g., an enhanced notification might be marked "urgent" when the notification provides an alert that a tornado has been spotted near the user's home address) (step 935). Where the message enhancement service 320 determines that it is not "quiet time" or that the notification is "urgent" (i.e., "urgency" overrides "quiet time"), the message enhancement service 320 determines whether wireless notification is available for the user 305 (e.g., through notification to a mobile phone, a PDA, a pager) (step 940). If wireless notification is available, the message enhancement service 320 determines a wireless delivery mechanism at which the user 305 prefers to receive the notification (step 945) and delivers the notification to that wireless delivery mechanism (step 950).

However, should the message enhancement service 320 determine that it is "quiet time" (step 930) and that the notification is not "urgent" (step 935), or that wireless notification is unavailable (step 940), the message enhancement service 320 delivers the notification to an email inbox (step 955). Irrespective of delivery or lack of delivery to other delivery mechanisms, the message enhancement service 320 also delivers the notification to an email archive (step 960).

Whether the enhanced notification is provided online, to a wireless device, or to an email inbox, the lifespan of the enhanced notification is monitored until the lifespan is expended or the user 305 accesses the notification (steps 965 and 970). If the lifespan of the notification becomes expended before the user accesses the notification (step 965), the notification may be vacated (e.g., the notification may be deleted from a notification delivery mechanism to which the notification was delivered) (step 975) and the delivery process may be concluded (step 910). Otherwise, if the notification is accessed by the user before the notification lifespan becomes expended (step 970), the content of the notification is provided to the user (step 980), and the delivery process may be concluded (step 910).

Alternatively, or in addition, after the user accesses the provided notification (step 970), the message enhancement service 320 may cause to be vacated redundant instances of the same notification that were delivered to other delivery mechanisms. For example, those redundant instances of the notification might be vacated as the lifespan period becomes expended. In another implementation, accessing of the enhanced notification by the user 305 may trigger the message enhancement service 320 to cause the redundant instances of the notification to be vacated. For example, access by the user of an online notification may cause the message enhancement service to transmit a secured (e.g., authenticated and encrypted) recall message to an email inbox to which a now redundant notification concurrently was delivered. The secured recall message may act to remove the redundant notification from the inbox before the redundant notification becomes a source of inconvenience to the user.

Figure 10:
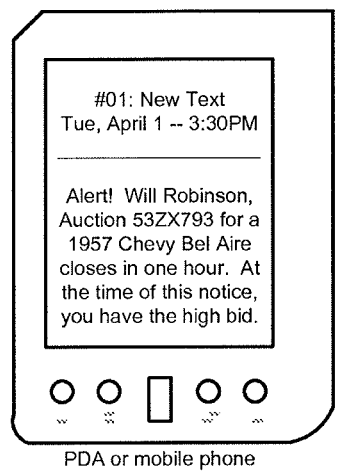
FIG. 10 illustrates an exemplary enhanced notification provided to a user at a mobile device.

FIG. 10 illustrates an auction notification that may be delivered to a PDA or mobile phone of a user. The PDA or mobile phone notifies the user "Alert! Will Robinson. Auction 53ZX793 for a 1957 Chevy Bel Aire closes in one hour. At the time of this notice, you have the high bid." In general, the auction notification may include any type of instant message, pop-up window, icon, and or audible or tactile alarm capable of gaining the attention of the user. The auction notification may present information derived from the electronic message of the message source. In addition, or in the alternative, the auction notification may include the contents of the electronic message. In another aspect, the auction notification may include an edit button for editing the presentation of the notification, and a respond/more information button for accessing the auction using the online service to update a bid and/or to obtain more detailed information regarding the auction.

The following scenario serves to illustrate exemplary implementations involving the processes and systems described.

A business may generate notification content but may partner with a notification provider for delivery of that content reconfigured according to parameters provided by the business. For example, a partner business may agree to notify a customer of customer account information each month. The business may communicate a message to the notification provider that includes text appropriate for such a reminder. The business also communicates a configuration instruction that is used by the notification provider to effect the desired message reconfiguration. The configuration instruction may be included as part of the original message text (to be recognized and removed by the notification provider during reconfiguration), in a header, or in an out-of-band communication with the notification provider.

The business also may enable the notification provider to supplement the notification content in an appropriate manner. For example, the configuration instruction may include schedule information indicating requested timing for the user's monthly reminder and access information for authenticated access to the user's account. In receipt of this information, the notification provider establishes a notification to be delivered to the user on the monthly schedule and based on the provided text and information to be gleaned through access to the user's account. Thereafter, when the monthly notification is triggered, access to the account information is obtained, an attachment is generated based on a screenshot or other representation of the account info, and a notification is delivered that integrates the notification text and the account information attachment.

Other implementations are within the scope of the following claims.

What is claimed is:

1. A method comprising:
receiving, via a communication network and at a client device, a notification associated with a source application from among a plurality of source applications on the client device, wherein each source application of the plurality of source applications is associated with source application specific reconfiguration notification settings;
in response to receiving the notification, accessing notification reconfiguration settings corresponding to the source application, wherein the notification reconfiguration settings comprise a notification definition indicating at least one notification characteristic that triggers reconfiguration of a received notification associated with the source application;
identifying one or more notification characteristics of the notification;
comparing, by one or more processors, the one or more notification characteristics of the notification with the at least one notification characteristic within the notification definition to determine that the one or more notification characteristics of the notification match the at least one notification characteristic within the notification definition;
based on determining the match, reconfiguring, by the one or more processors, the notification for presentation at the client device by creating a reconfigured notification based on the notification;
providing the reconfigured notification for presentation to the user via the client device using one or more delivery mechanisms;
receiving a second notification associated with the source application on the client device;
determining characteristics of the second notification are different from the at least one notification characteristic within the notification definition for the notification reconfiguration settings associated with the source application; and
based on the characteristics of the second notification being different from the at least one notification characteristic, providing the second notification for presentation to the user via the client device rather than reconfiguring the second notification.

2. The method as recited in claim 1, wherein the reconfigured notification comprises one of an icon, a pop-up notification, a text message, or an instant message.

3. The method as recited in claim 2, wherein the reconfigured notification comprises an icon.

4. The method as recited in claim 2, further comprising providing additional information regarding the notification upon detecting a user interaction with the reconfigured notification.

5. The method as recited in claim 4, wherein providing additional information comprises providing access to the notification.

6. The method as recited in claim 1, wherein the reconfigured notification references a source of the notification.

7. The method as recited in claim 1, further comprising reconfiguring the notification in accordance with one or more user selected preferences.

8. The method as recited in claim 7, wherein the one or more user selected preferences specify at least one notification delivery format from a plurality of notification delivery formats.

9. The method as recited in claim 8, wherein the plurality of notification delivery formats comprise one or more of icons, pop-up notifications, text messages, instant messages, flashing indicators, a tactile alarm, or audible alerts.

10. The method as recited in claim 9, further comprising concurrently presenting the reconfigured notification in two different notification delivery formats.

11. The method as recited in claim 10, wherein the two different notification delivery formats comprise an icon and an audible alert.

12. The method as recited in claim 10, wherein the two different notification delivery formats comprise an icon and a pop-up notification.

13. The method as recited in claim 12, wherein the pop-up notification comprises a pop-up window.

14. The method as recited in claim 1, wherein receiving the notification at the client device comprises receiving the notification at a mobile device.

15. The method recited in claim 1, wherein the notification has a format of a communication message.

16. The method recited in claim 1, further comprising:
determining a source of the notification; and
wherein reconfiguring the notification is further based on the source of the notification.

17. A non-transitory computer-readable storage medium including a set of instructions that, when executed by at least one processor, cause a client device to perform steps comprising:

receiving, via a communication network and at the client device, a notification associated with a source application from among a plurality of source applications on the client device, wherein each source application of the plurality of source applications is associated with source application specific reconfiguration notification settings;

in response to identifying the notification, accessing notification reconfiguration settings corresponding to the source application, wherein the notification reconfiguration settings comprise a notification definition indicating at least one notification characteristic that triggers reconfiguration of a received notification associated with the source application;

identifying one or more notification characteristics of the notification;

comparing, by one or more processors, the one or more notification characteristics of the notification with the at least one notification characteristic within the notification definition to determine that the one or more notification characteristics of the notification match the at least one notification characteristic within the notification definition;

based on determining the match, reconfiguring the notification for presentation at the client device by creating a reconfigured notification based on the notification;

providing the reconfigured notification for presentation to the user via the client device using one or more delivery mechanisms;

receiving a second notification associated with the source application on the client device;

determining characteristics of the second notification are different from the at least one notification characteristic within the notification definition for the notification reconfiguration settings associated with the source application; and based on the characteristics of the second notification being different from the at least one notification characteristic, providing the second notification for presentation to the user via the client device rather than reconfiguring the second notification.

18. The computer-readable storage medium as recited in claim 17, wherein the reconfigured notification comprises one of an icon, a pop-up notification, a text message, or an instant message.

19. The computer-readable storage medium as recited in claim 18, wherein the reconfigured notification comprises an icon.

20. The computer-readable storage medium as recited in claim 18, further comprising instructions that, when executed by the at least one processor, cause the client device to provide additional information regarding the notification upon detecting a user interaction with the reconfigured notification.

21. The computer-readable storage medium as recited in claim 20, wherein providing additional information comprises providing access to the notification.

22. The computer-readable storage medium as recited in claim 21, further comprising instructions that, when executed by the at least one processor, cause the client device to reconfigure the notification in accordance with one or more user selected preferences.

23. The computer-readable storage medium as recited in claim 22, wherein the one or more user selected preferences specify at least one notification delivery format from a plurality of notification delivery formats.

24. The computer-readable storage medium as recited in claim 23, wherein the plurality of notification delivery formats comprise one or more of icons, pop-up notifications, flashing indicators, tactile alarms, or audible alerts.

25. The computer-readable storage medium as recited in claim 24, further comprising instructions that, when executed by the at least one processor, cause the client device to concurrently display the reconfigured notification in two different notification delivery formats.

26. The computer-readable storage medium as recited in claim 25, wherein:

receiving the notification at the client device comprises receiving the notification at a mobile device; and the one or more delivery mechanisms enable display of the reconfigured notification on the mobile device.

27. The computer-readable storage medium as recited in claim 26, wherein the mobile device comprises a mobile phone.

28. The computer-readable storage medium as recited in claim 27, wherein the one or more delivery mechanisms comprise an operating system of the mobile device.

29. A method comprising:

receiving, via a communication network and at a client device, an electronic message associated with a source application from among a plurality of source applications on the client device, wherein each source application of the plurality of source applications is associated with source application specific notification settings;

in response to receiving the electronic message, accessing notification settings corresponding to the source application, wherein the notification settings comprise an electronic message definition indicating at least one electronic message characteristic that triggers generation of a notification;

identifying one or more characteristics of the electronic message;

comparing, by one or more processors, the one or more characteristics of the electronic message with the at least one electronic message characteristic within the electronic message definition to determine that the one or more characteristics of the electronic message match the at least one electronic message characteristic within the electronic message definition;

based on determining the match, generating, by the one or more processors a notification for presentation at the client device, the notification including information derived from the electronic message;

providing the notification via one or more delivery mechanisms for display to the user via the client device;

receiving a second electronic message associated with the source application on the client device;

determining characteristics of the second electronic message are different from the at least one electronic message characteristic within the electronic message definition; and based on the characteristics of the second notification being different from the at least one electronic message characteristic, providing the second electronic message for presentation to the user via the client device rather than providing a second notification for the second electronic message.

30. The method as recited in claim 29, wherein the notification comprises an icon.

31. The method as recited in claim 29, further comprising providing additional information regarding the electronic message upon detecting a user interaction with the notification.

32. The method as recited in claim 31, wherein providing additional information comprises providing access to the electronic message.

33. The method as recited in claim 29, wherein the notification references a source of the electronic message.

34. The method as recited in claim 29, further comprising configuring the notification in accordance with one or more user selected preferences.

35. The method as recited in claim 34, wherein the one or more user selected preferences specify at least one notification delivery format from a plurality of notification delivery formats.

36. The method as recited in claim 35, wherein the plurality of notification delivery formats comprise one or more of icons, text messages, emails, pop-up notifications, flashing indicators, or audible alerts.

37. The method as recited in claim 35, further comprising concurrently sending the notification in two different notification delivery formats.

38. The method as recited in claim 37, wherein the two different notification delivery formats comprise a text message and an email.

39. The method as recited in claim 37, wherein the two different notification delivery formats comprise an icon and a pop-up notification.

40. The method as recited in claim 29, wherein providing the notification via one or more delivery mechanisms comprises providing the notification for display on a mobile device.

41. The method as recited in claim 40, wherein the mobile device comprises a mobile phone.

42. A client device comprising:
   at least one processor; and
   at least one non-transitory computer readable storage medium storing instructions thereon that, when executed by the at least one processor, cause the client device to:
      receive, via a communications network and the client device, an electronic message associated with a source application from among a plurality of source applications on the client device, wherein each source application of the plurality of source applications is associated with source application specific notification settings;
      in response to receiving the electronic message, access notification settings corresponding to the source application, wherein the notification settings comprise an electronic message definition indicating at least one electronic message characteristic that triggers generation of a notification;
      identify one or more characteristics of the electronic message;
      compare the one or more characteristics of the electronic message with the at least one electronic message characteristic within the electronic message definition to determine that the one or more characteristics of the electronic message match the at least one electronic message characteristic within the electronic message definition;
      based on determining the match, generate a notification for presentation to the user at the client device, the notification including information derived from the electronic message;
      provide the notification for display via the client device;
      receive a second electronic message associated with the source application on the client device;
      determining characteristics of the second electronic message are different from the at least one electronic message characteristic within the electronic message definition; and
      based on the characteristics of the second notification being different from the at least one electronic message characteristic, providing the second electronic message for presentation to the user via the client device rather than providing a second notification for the second electronic message.

43. The client device as recited in claim 42, further comprising instructions, that when executed by the at least one processor, cause the client device to provide, for presentation to the user, additional information regarding electronic message upon detecting a user interaction with the notification at the client device.

44. The client device as recited in claim 43, wherein the client device comprises a mobile device.

45. The client device as recited in claim 44, wherein the client device comprises a mobile phone.

46. The client device as recited in claim 43, wherein the additional information comprises the contents of the electronic message.

47. The client device as recited in claim 43, further comprising instructions, that when executed by the at least one processor, cause the client device determine at least one delivery format of a plurality of delivery formats based on the notification settings associated with the source application.

48. The client device as recited in claim 47, wherein the plurality of delivery formats comprise one or more of icons, text messages, emails, pop-up notifications, tactile alarms, flashing indicators, or audible alerts.

49. The client device as recited in claim 47, wherein the notification settings associated with the source application indicate two or more formats of the plurality of formats.

50. The client device as recited in claim 49, further comprising instructions, that when executed by the at least one processor, cause the client device to concurrently send the notification to the client device in two delivery formats.

* * * * *